(12) United States Patent
Hayasaka

(10) Patent No.: US 7,848,885 B2
(45) Date of Patent: Dec. 7, 2010

(54) COLLISION DETERMINING APPARATUS FOR A VEHICLE

(75) Inventor: Masatoshi Hayasaka, Shioya-gun (JP)

(73) Assignee: Keihin Corporation, Tokyo (JP)

( * ) Notice: Subject to any disclaimer, the term of this patent is extended or adjusted under 35 U.S.C. 154(b) by 1109 days.

(21) Appl. No.: 11/229,381

(22) Filed: Sep. 16, 2005

(65) Prior Publication Data

US 2006/0069509 A1   Mar. 30, 2006

(30) Foreign Application Priority Data

Sep. 24, 2004 (JP) ............................ P2004-277693
Sep. 24, 2004 (JP) ............................ P2004-277694
Sep. 24, 2004 (JP) ............................ P2004-277695
Sep. 24, 2004 (JP) ............................ P2004-277696

(51) Int. Cl.
G08G 1/16 (2006.01)
B60R 22/00 (2006.01)
B60R 21/16 (2006.01)
B60Q 1/00 (2006.01)
F01N 13/18 (2010.01)
F01N 1/08 (2010.01)

(52) U.S. Cl. .................... 701/301; 701/45; 340/436; 180/282; 180/274; 280/729

(58) Field of Classification Search .............. 701/45, 701/36, 46, 47, 49, 301; 180/268, 271–282; 280/734, 735, 731, 730, 728; 340/436, 438, 340/903, 42.5; 364/424.055, 424.056, 424.057
See application file for complete search history.

(56) References Cited

U.S. PATENT DOCUMENTS 5,927,748 A * 7/1999 O'Driscoll ................. 280/729

(Continued)

FOREIGN PATENT DOCUMENTS

DE    101 09 043    7/2002

(Continued)

OTHER PUBLICATIONS

Hayasaka, Masatoshi; En,Tamotsu; Hiruta, Yukio; Fukui, Tsutomu; "Collision Determining Device for Vehicle", Jul. 9, 2003; Keihin Corporation, Honda Motor Company Ltd., Publication No. 2003-191817.*

(Continued)

*Primary Examiner*—Jack Keith
*Assistant Examiner*—Muhammad Shafi
(74) *Attorney, Agent, or Firm*—Fish & Richardson P.C.

(57) ABSTRACT

A collision determining apparatus for a vehicle includes a first acceleration measuring device which measures an acceleration acting on the vehicle, a movement amount calculating device which calculates an amount of movement of an occupant, a change in movement speed calculating device which calculates a change in movement speed of the occupant, a first collision determining threshold value setting device which sets collision determining threshold values for a correlation between the amount of movement of the occupant and the change in movement speed of the occupant, a first collision determining device which determines whether or not the correlation exceeds the collision determining threshold value, and a first control signal generating device which generates a control signal which instructs that an occupant protection apparatus be operated slowly in multiple stages or be operated rapidly in multiple stages.

10 Claims, 18 Drawing Sheets

U.S. PATENT DOCUMENTS

| | | | | |
|---|---|---|---|---|
| 5,983,148 | A * | 11/1999 | Bigi et al. | 701/45 |
| 6,005,479 | A * | 12/1999 | Ide | 340/438 |
| 6,512,969 | B1 * | 1/2003 | Wang | 701/45 |
| 7,036,845 | B2 | 5/2006 | Bentele-Calvoer et al. | |
| 7,286,920 | B2 * | 10/2007 | Ide | 701/45 |
| 2003/0127271 | A1 * | 7/2003 | Hayasaka et al. | 180/274 |
| 2003/0230879 | A1 * | 12/2003 | Konda et al. | 280/735 |
| 2006/0069483 | A1 * | 3/2006 | Hayasaka et al. | 701/45 |

FOREIGN PATENT DOCUMENTS

| | | | |
|---|---|---|---|
| DE | 10109043 | | 7/2002 |
| DE | 101 16 926 | | 10/2002 |
| EP | 0727 336 | | 8/1996 |
| EP | 0818 357 | | 1/1998 |
| JP | 04-146851 | | 5/1992 |
| JP | 10-086788 | | 4/1998 |
| JP | 10-287203 | * | 10/1998 |
| JP | H10-287203 | | 10/1998 |
| JP | 11-048907 | | 2/1999 |
| JP | H11-078769 | | 3/1999 |
| JP | 11-236188 | | 9/1999 |
| JP | 2000-168490 | | 6/2000 |
| JP | 2001-080452 | | 3/2001 |
| JP | 2001-277998 | | 10/2001 |
| JP | 2002-019570 | | 1/2002 |
| JP | 2003-191817 | * | 7/2003 |
| JP | 2003191817 | * | 7/2003 |
| WO | 2004-523415 | | 8/2004 |

OTHER PUBLICATIONS

Office Action issued on Counterpart JP patent application No. 2004-277694 dated Oct. 2, 2007.

Office Action issued on Counterpart JP patent application No. 2004-277696 dated Oct. 2, 2007.

Office Action issued on Counterpart JP patent application No. 2007-227693 dated Oct. 2, 2007.

Japanese Office Action for counterpart Application No. 2004-277695 dated Jan. 5, 2010, 4 pages.

* cited by examiner

COLLISION DETERMINING APPARATUS FOR A VEHICLE

BACKGROUND OF THE INVENTION

1. Field of the Invention

The present invention relates to a collision determining apparatus for a vehicle that determines a vehicle collision, and causes an occupant protection apparatus such as, for example, an airbag apparatus or a seatbelt pretensioner to be operated.

Priority is claimed on Japanese Patent Application No. 2004-277693, filed Sep. 24, 2004, Japanese Patent Application No. 2004-277694, filed Sep. 24, 2004, Japanese Patent Application No. 2004-277695, filed Sep. 24, 2004, and on Japanese Patent Application No. 2004-277696, filed Sep. 24, 2004, the contents of which are incorporated herein by reference.

2. Description of Related Art

Conventionally, collision determining apparatuses for vehicles are known that are provided with acceleration sensors that, for example, measure the acceleration (or the deceleration) that is applied to a vehicle. These apparatuses detect changes in the acceleration of a vehicle using acceleration signals that are output from the acceleration sensor, and perform temporal primary integration or temporal secondary integration on the acceleration signals. When these integral values exceed predetermined respective threshold values, an occupant protection apparatus such as, for example, an airbag apparatus or a seatbelt pretensioner is operated.

When it is determined by this type of collision determining apparatus for a vehicle that the vehicle is in a collision, the airbag apparatus, for example, ignites a gas generating agent inside an inflator using a squib so that gas is generated by the inflator. The airbag is then inflated by this gas so as to control any secondary collision between an occupant and components inside the vehicle interior (for example, refer to Japanese Unexamined Patent Application, First Publication No. 2003-191817).

In a conventional collision determining apparatus for a vehicle such as that described above, it is necessary for the state of the collision to be determined in a short time from when the collision occurs, and for the operation of an occupant protection apparatus to then be controlled.

However, by simply operating an occupant protection apparatus using a constant characteristic when the integral value of the acceleration signals output from the acceleration sensor exceeds a predetermined threshold value, problems arise in that the occupant protection apparatus is operated even when the collision is not so serious as to require the occupant protection apparatus to be operated, and in that the operating characteristics of the occupant protection apparatus are not appropriate to the state of the collision, and thus it is not possible to ensure the desired protection capability.

Moreover, it is not possible to determine precisely the state of a collision simply by determining whether or not a correlation between the respective integral values from the primary integration and secondary integration of the acceleration signals (i.e., changes in the movement speed of the occupant and the amount of movement of the occupant) that are output from the acceleration sensor exceeds a predetermined threshold value. As a result, the problem arises in that an occupant protection apparatus may be operated at inappropriate times.

SUMMARY OF THE INVENTION

The present invention was conceived in view of the above described circumstances and it is an object thereof to provide a collision determining apparatus for a vehicle that can make an appropriate collision determination that corresponds to the state of a collision in a short period of time, and that can cause an occupant protection apparatus to be appropriately operated in accordance with the collision determination.

The collision determining apparatus for a vehicle of the present invention includes: a first acceleration measuring device which measures an acceleration acting on the vehicle; a movement amount calculating device which calculates an amount of movement of an occupant based on the acceleration which is measured by the first acceleration measuring device; a change in movement speed calculating device which calculates a change in movement speed of the occupant based on the acceleration which is measured by the first acceleration measuring device; a first collision determining threshold value setting device which sets a collision determining threshold value for a correlation between the amount of movement of the occupant and the change in movement speed of the occupant; a first collision determining device which determines whether or not the correlation exceeds the collision determining threshold value; and a first control signal generating device which generates a control signal which instructs that an occupant protection apparatus be operated slowly in multiple stages or be operated rapidly in multiple stages, in accordance with a result of a determination by the first collision determining device.

According to the collision determining apparatus for a vehicle of the present invention, it is possible to ascertain accurately the state of an occupant when a collision occurs by causing an occupant protection apparatus to be operated slowly or rapidly in multiple stages in accordance with the result of collision determinations for a plurality of collision determination threshold values. Furthermore, it is possible to operate the occupant protection apparatus correctly in accordance with the state of the collision.

For example, if there is a possibility that a secondary collision will occur when the amount of movement is relatively large even if the movement speed of the occupant is relatively small, then it is possible to suitably protect an occupant by operating the occupant protection apparatuses slowly in multiple stages. Moreover, if there is a possibility that the degree of injury to an occupant will be increased by this secondary collision when the change in movement speed is relatively large even if the amount of movement of the occupant is relatively small, then it is possible to suitably protect an occupant by operating the occupant protection apparatuses rapidly in multiple stages.

In the collision determining apparatus for a vehicle of the present invention, it is preferable that the first collision determining threshold value setting device set respective collision determining threshold values to correspond to each stage of the rapid operation in multiple stages, and within a predetermined time from a point of time at which it was determined that the correlation has exceeded a collision determining threshold value which corresponds to an appropriate stage of the rapid operation, when it is determined that the correlation exceeds a collision determining threshold value which corresponds to a next stage after the appropriate stage, the first control signal generating device generate a control signal which instructs that an operation of the next stage be performed at a point of time at which it is determined that the correlation has exceeded the collision determining threshold value which corresponds to the next stage.

According to the collision determining apparatus for a vehicle of the present invention, within a predetermined time after an occupant protection apparatus has been operated at the appropriate stage of a rapid operation, when the correlation between the amount of movement and the change in movement speed exceeds a collision determining threshold value that corresponds to the next stage of this rapid operation, then the occupant protection apparatus can be operated immediately at this next stage. As a result, it is possible to prevent a delay in the operation of each stage, in accordance with the state of the collision.

In the collision determining apparatus for a vehicle of the present invention, it is preferable that the first collision determining threshold value setting device set respective collision determining threshold values to correspond to each stage of the rapid operation in multiple stages, and within a predetermined time from a point of time at which it was determined that the correlation has exceeded a collision determining threshold value which corresponds to an appropriate stage of the rapid operation, when it is determined that the correlation exceeds a collision determining threshold value which corresponds to a next stage after the appropriate stage, the first control signal generating device generate a control signal which instructs that an operation of the next stage be performed after the predetermined time has lapsed.

According to the collision determining apparatus for a vehicle of the present invention, within a predetermined time after an occupant protection apparatus has been operated at the appropriate stage of a rapid operation, when the correlation between the amount of movement and the change in movement speed exceeds a collision determining threshold value that corresponds to the next stage of this rapid operation, then it is possible to cause the occupant protection apparatus to be operated at the next stage of the rapid operation after a predetermined time has passed since the occupant protection apparatus was operated rapidly at this appropriate stage. As a result, it is possible to prevent each stage of an operation being executed at an excessively early timing, in accordance with the state of the collision.

In the collision determining apparatus for a vehicle of the present invention, it is preferable that, after a predetermined delay time has lapsed since a control signal which instructs that an operation of an appropriate stage of the slow operation be performed, the first control signal generating device generate a control signal which instructs that an operation of the next stage after this appropriate stage of a slow operation be performed.

According to the collision determining apparatus for a vehicle of the present invention, after a predetermined delay time has passed since the occupant protection apparatus was operated at an appropriate stage of a slow operation, the occupant protection apparatus is operated so-called automatically at the next stage of the slow operation, it is possible to prevent the operation of each stage of a slow operation being executed at an excessively early timing, in accordance with the state of the collision.

In the collision determining apparatus for a vehicle of the present invention, it is preferable that the collision determining apparatus further include a second acceleration measuring device which measures an acceleration acting on a position further to an outer peripheral portion side of a vehicle than the first acceleration measuring device, wherein the first collision determining threshold value setting device sets the collision determining threshold values based on the acceleration which is measured by the second acceleration measuring device.

According to the collision determining apparatus for a vehicle of the present invention, in accordance with the result of the measurement of a second acceleration measuring device which has a relatively high sensitivity when detecting the occurrence of a collision, collision determining threshold values are set for correlations between the amount of movement of an occupant and the change in the movement speed of the occupant based on the result of the measurement of the first acceleration measuring device. As a result, it is possible to ascertain accurately whether or not a collision has occurred as well as to ascertain the state of the collision and also operate the occupant protection apparatus at an earlier timing compared with when the operation of the occupant protection apparatus is controlled based solely on the result of the measurement of the first acceleration measuring device.

The collision determining apparatus for a vehicle of the present invention includes: a first acceleration measuring device which measures an acceleration acting on the vehicle; a movement amount calculating device which calculates an amount of movement of an occupant based on the acceleration which is measured by the first acceleration measuring device; a change in movement speed calculating device which calculates a change in movement speed of the occupant based on the acceleration which is measured by the first acceleration measuring device; a first collision determining threshold value setting device which sets a plurality of collision determining threshold values for a correlation between the amount of movement of the occupant and the change in movement speed of the occupant; a first collision determining device which determines whether or not the correlation exceeds the collision determining threshold value; and a second control signal generating device which generates a control signal which instructs that an occupant protection apparatus be operated slowly in multiple stages, or be operated rapidly in multiple stages, or be operated rapidly in a single stage, in accordance with a result of a determination by the first collision determining device.

According to the collision determining apparatus for a vehicle of the present invention, it is possible to accurately ascertain the state of a collision which has occurred by causing the occupant protection apparatus to be operated slowly in multiple stages, or to be operated rapidly in multiple stages, or to be operated rapidly in one stage in accordance with the result of the collision determinations for a plurality of collision determining threshold values. Furthermore, the occupant protection apparatus can be operated correctly in accordance with the state of the collision.

For example, if there is a possibility that a secondary collision will occur when the amount of movement of an occupant is relatively large even if the movement speed is relatively small, then it is possible to suitably protect an occupant by causing occupant protection apparatuses to be operated slowly in multiple stages. Moreover, if there is a possibility that the degree of injury to an occupant will be increased by this secondary collision when the movement speed of the occupant is relatively large even if the amount of movement is relatively small, then it is possible to suitably protect an occupant by causing the occupant protection apparatuses to be operated rapidly in multiple stages. Furthermore, if there is a possibility that the degree of injury to an occupant arising from this secondary collision will become excessively high when the movement speed of the occupant is relatively large even if the amount of movement is relatively extremely minute, then it is possible to suitably protect an occupant by causing the occupant protection apparatuses to be operated rapidly in a single stage.

The collision determining apparatus for a vehicle of the present invention includes: a first acceleration measuring device which measures an acceleration acting on the vehicle; a movement amount calculating device which calculates an amount of movement of an occupant based on the acceleration which is measured by the first acceleration measuring device; a change in movement speed calculating device which calculates a change in movement speed of the occupant based on the acceleration which is measured by the first acceleration measuring device; an engagement state detecting device which detects a state of engagement of a seatbelt of the occupant; a seat position detecting device which detects a state of a seat position; a second collision determining threshold value setting device which sets a collision determining threshold value for a correlation between the amount of movement of the occupant and the change in movement speed of the occupant based on respective detection results from the engagement state detecting device and the seat position detecting device; a first collision determining device which determines whether or not the correlation exceeds the collision determining threshold value; and a third control signal generating device which generates a control signal which controls an operation of an occupant protection apparatus, in accordance with a result of a determination by the first collision determining device.

According to the collision determining apparatus for a vehicle of the present invention, by setting collision determining threshold values for a correlation between an amount of movement of an occupant and a change in the movement speed of the occupant in accordance with whether or not the seatbelt of the occupant is engaged and with the position of the seat, it is possible to determine the mode of movement of the occupant in more detail compared with when the operation of an occupant protection apparatus is controlled based simply on the result of the measurement of the first acceleration measuring device. It is therefore possible to operate the occupant protection apparatus at a more appropriate timing.

In the collision determining apparatus for a vehicle of the present invention, it is preferable that the collision determining apparatus further include a second acceleration measuring device which measures an acceleration acting on a position further to an outer peripheral portion side of the vehicle than the first acceleration measuring device, wherein the second collision determining threshold value setting device which sets the collision determining threshold value based on the acceleration which is measured by the second acceleration measuring device in addition to the respective detection results from the engagement state detecting device and the seat position detecting device.

According to the collision determining apparatus for a vehicle of the present invention, in addition to whether or not the seatbelt of the occupant is engaged and with the position of the seat, collision determining threshold values are set for correlations between the amount of movement of an occupant and the change in the movement speed of the occupant in accordance with the result of the measurement of the second acceleration measuring device that has a relatively high detection sensitivity when detecting the occurrence of a collision. As a result, it is possible to ascertain accurately whether or not a collision has occurred as well as to ascertain the state of the collision and also operate an occupant protection apparatus at an earlier timing compared with when the operation of the occupant protection apparatus is controlled based solely on the result of the measurement of the first an acceleration measuring device.

The collision determining apparatus for a vehicle of the present invention includes: a first acceleration measuring device which measures an acceleration acting on the vehicle; a movement amount calculating device which calculates an amount of movement of an occupant based on the acceleration which is measured by the first acceleration measuring device; a change in movement speed calculating device which calculates a change in movement speed of the occupant based on the acceleration which is measured by the first acceleration measuring device; a change in acceleration calculating device which calculates a change in acceleration based on acceleration which is measured by the first acceleration measuring device; a third collision determining threshold value setting device which sets a collision determining threshold value for a correlation between the amount of movement of the occupant, the change in movement speed of the occupant, and the change in acceleration; a second collision determining device which determines whether or not the correlation exceeds the collision determining threshold value; and a fourth control signal generating device which generates a control signal which controls an operation of an occupant protection apparatus, in accordance with a result of a determination by the second collision determining device.

According to the collision determining apparatus for a vehicle of the present invention, it is possible to determine in detail the mode of movement of the occupant by determining whether or not a correlation between an amount of movement of the occupant, a change in the movement speed of the occupant, and a change in the acceleration that shows the mode of the acceleration that is generated has exceeded a collision determining threshold value. As a result, an occupant protection apparatus can be appropriately operated.

In the collision determining apparatus for a vehicle of the present invention, it is preferable that the collision determining apparatus further include a change quantity of state calculating device which calculates a quantity of state of change by adding the change in movement speed of the occupant which is calculated by the change in movement speed calculating device together with the change in acceleration which is calculated by the change in acceleration calculating device, wherein the third collision determining threshold value setting device sets a collision determining threshold value for a correlation between the amount of movement and the quantity of state of change of the occupant, and the second collision determining device determines whether or not the correlation between the amount of movement and the quantity of state of change of the occupant exceeds the collision determining threshold value for the correlation between the amount of movement and the quantity of state of change of the occupant.

According to the collision determining apparatus for a vehicle of the present invention, by determining whether or not a correlation between an amount of movement of the occupant and a quantity of state of change that is obtained by adding together a change in the movement speed of the occupant and the change in the acceleration of the occupant exceeds a collision determining threshold value, in the initial stages of a collision occurrence in particular, it is possible to determine the state of the collision in detail compared with when a simple determination is made as to whether or not a correlation between an amount of movement of the occupant and a change in movement speed of an occupant has exceeded a collision determining threshold value. As a result, it is possible to more appropriately operate an occupant protection apparatus.

In the collision determining apparatus for a vehicle of the present invention, it is preferable that the third collision determining threshold value setting device set collision determining threshold values, and the fourth control signal generating device generate a control signal which instructs that an occupant protection apparatus be operated slowly in multiple stages, or be operated rapidly in multiple stages, or be operated rapidly in a single stage, in accordance with a result of a determination by the collision determining device.

According to the collision determining apparatus for a vehicle of the present invention, it is possible to ascertain accurately and in detail the state of a collision that has occurred by causing an occupant protection apparatus to be operated slowly in multiple stages, or to be operated rapidly in multiple stages, or to be operated rapidly in one stage in accordance with the result from collision determinations for a plurality of collision determining threshold values. Furthermore, the occupant protection apparatus can be operated correctly in accordance with the state of the collision.

BRIEF DESCRIPTION OF THE DRAWINGS

FIG. 20A is a view showing an example of temporal changes in a change in the acceleration ΔG in response to a frontal collision, while

FIG. 21A is a view showing an example of temporal changes in a change in the acceleration ΔG in response to an oblique collision, while

DESCRIPTION OF THE PREFERRED EMBODIMENTS

A first embodiment of the collision determining apparatus for a vehicle of the present invention will now be described with reference made to FIGS. 1 to 4.

Figure 1:
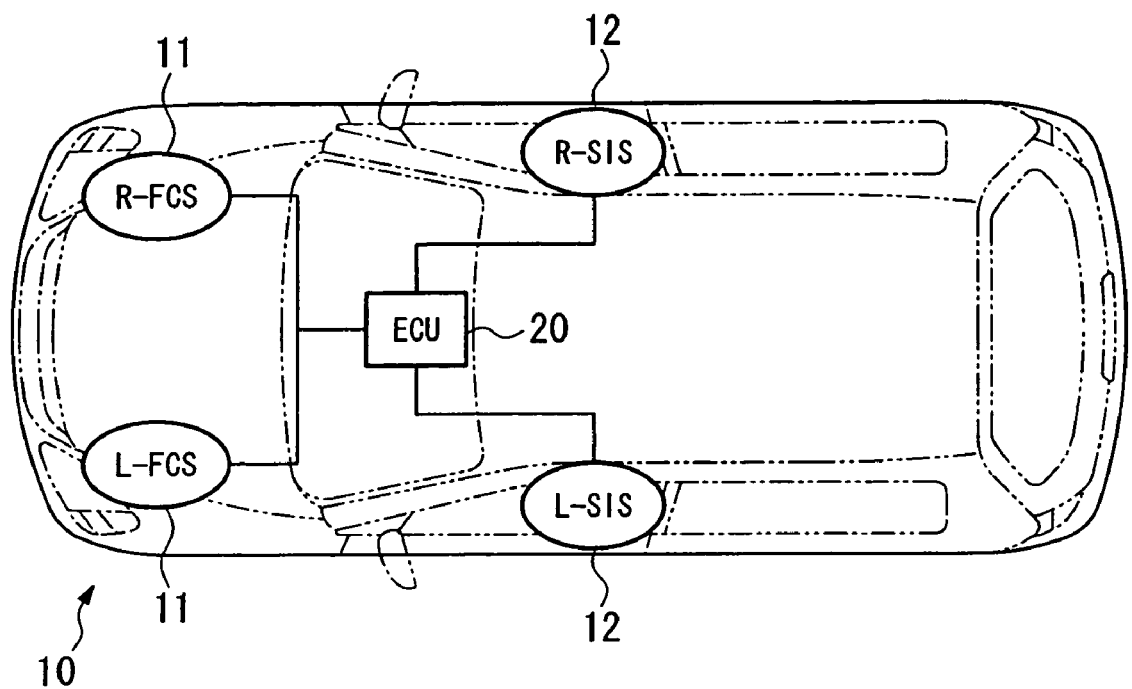
FIG. 1 is a view showing a first embodiment of the collision determining apparatus for a vehicle of the present invention and is a schematic view of a vehicle equipped with the collision determining apparatus for a vehicle.

As shown in FIG. 1, a collision determining apparatus for a vehicle 10 of the present embodiment is provided with a plurality of satellite sensors and an electronic control unit (ECU) 20 that is located in the center of the vehicle. The satellite sensors are formed by a plurality of acceleration sensors, for example, two front crash sensors (second acceleration measuring device (i.e., L-FCS and R-FCS)) 11 that are located at a right front portion and a left front portion of the vehicle, and two side impact sensors (second acceleration measuring device (i.e., L-SIS and R-SIS)) 12 that are located at a right side portion and a left side portion of the vehicle. Acceleration signals that are output from the respective satellite sensors are input into the electronic control unit 20.

Figure 2:
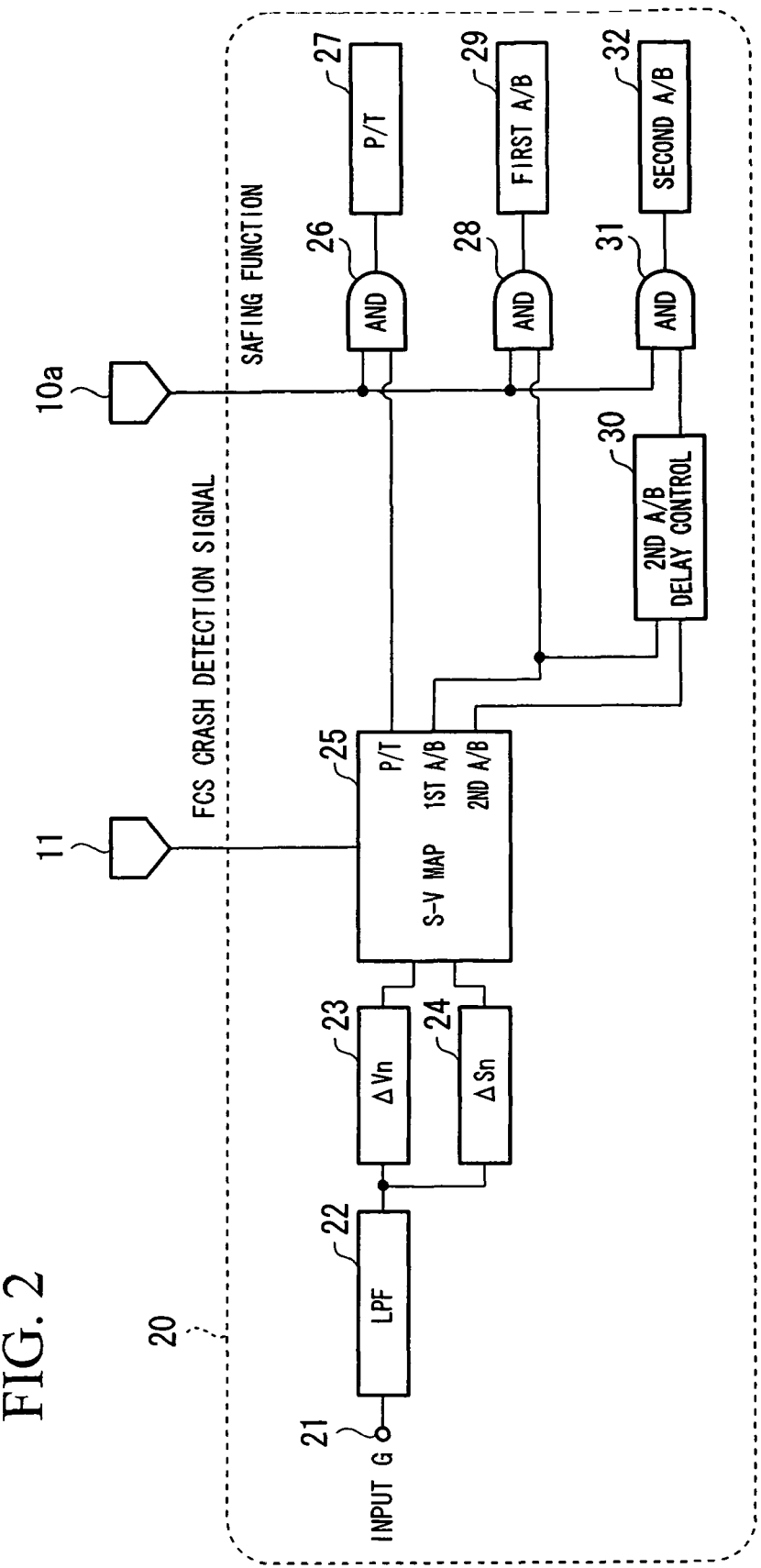
FIG. 2 is a block diagram of the first embodiment of the collision determining apparatus for a vehicle.

As shown in FIG. 2, the electronic control unit 20 is provided with an acceleration sensor (first acceleration measuring device) 21, a filter processing section 22, a ΔVn calculation section (change in movement speed calculating device) 23, a ΔSn calculation section (movement amount calculating device) 24, an SV determination processing section (first collision determining threshold value setting device) 25, a P/T AND circuit 26, a P/T startup signal generating section (first control signal generating device) 27, a first A/B AND circuit 28, a first A/B startup signal generating section (first control signal generating device) 29, a second A/B delay control section 30, a second A/B AND circuit 31, and a second A/B startup signal generating section (first control signal generating device) 32.

The acceleration sensor 21 outputs acceleration signals G at a voltage level that matches the size of acceleration (or deceleration) acting, for example, in a longitudinal direction or transverse direction of a vehicle.

The filter processing section 22 is equipped with a low pass filter (LPF) that removes high frequency components, which are noise components, from the acceleration signals G that are output from the acceleration sensor 21.

The ΔVn calculation section 23 performs a primary integration for time on the acceleration signals G that are output from the filter processing section 22, and, as shown below in Formula (1), for example, calculates a change in movement speed of an occupant ΔVn in a time interval having a predetermined time width n relative to the current time tp (i.e., tp−n≦t≦tp), and outputs the result to the SV determination processing section 25.

The ΔSn processing section 24 performs a secondary integration for time on the acceleration signals G that are output from the filter processing section 22, and, as shown below in Formula (2), for example, calculates an amount of movement of an occupant ΔSn in the time interval having a predetermined time width n relative to the current time tp (i.e., tp−n≦t≦tp), and outputs the result to the SV determination processing section 25.

$$\Delta Vn = \int_{tp-n}^{tp} G(t)\,dt \quad (1)$$

$$\Delta Sn = \int \int_{tp-n}^{tp} G(t)\,dt \quad (2)$$

The SV determination processing section 25 sets, for a plurality of different occupant protection apparatuses such as, for example, airbags and seatbelt pretensioners, collision determination threshold values, which are boundary values of respective areas that specify whether each operation is possible or not possible for a plurality of operating states of a vehicle protection apparatus, on an S-V map that shows a correlation between a change in movement speed of an occupant ΔV and the amount of movement by the occupant ΔS (for example, rectangular coordinates that take the amount of movement by the occupant ΔS as the horizontal axis and the change in movement speed of an occupant ΔV as the vertical axis) while referring to determinations results that show whether or not a collision of a predetermined size is measured by the satellite sensors (for example, by the front crash sensors (L-FCS or R-FCS) 11).

In addition, the SV determination processing section 25 determines for each occupant protection apparatus whether or not the correlation between the change in movement speed of an occupant ΔVn that is input from the ΔVn calculation section 23 and the amount of movement of the occupant ΔSn that is input from the ΔSn calculation section 24 exceeds a predetermined collision determination threshold value. For example, when it is determined that the correlation exceeds the collision determination threshold value for a seatbelt pretensioner, a P/T signal having a true value of "1" is output to the P/T AND circuit 26. Moreover, when it is determined that the correlation exceeds the respective collision determination threshold values corresponding to each stage of an operation in multiple stages (for example, an operation in two stages) of, for example, an airbag apparatus, then a first A/B signal having a true value of "1" corresponding to the first stage of the operation is output to the first A/B AND circuit 28 and to the second A/B delay control section 30, and a second A/B signal having a true value of "1" corresponding to the second stage of the operation is output to the second A/B delay control circuit 30.

Note that a multiple stage operation of the airbag apparatus is an operation that is based on multiple stage ignition commands. Namely, when the airbag is expanded by generating a gas using an inflator, the gas is not generated one time only at maximum output, but instead the gas is generated, for example, by igniting a plurality of gas generating agents in successive stages.

Figure 3:
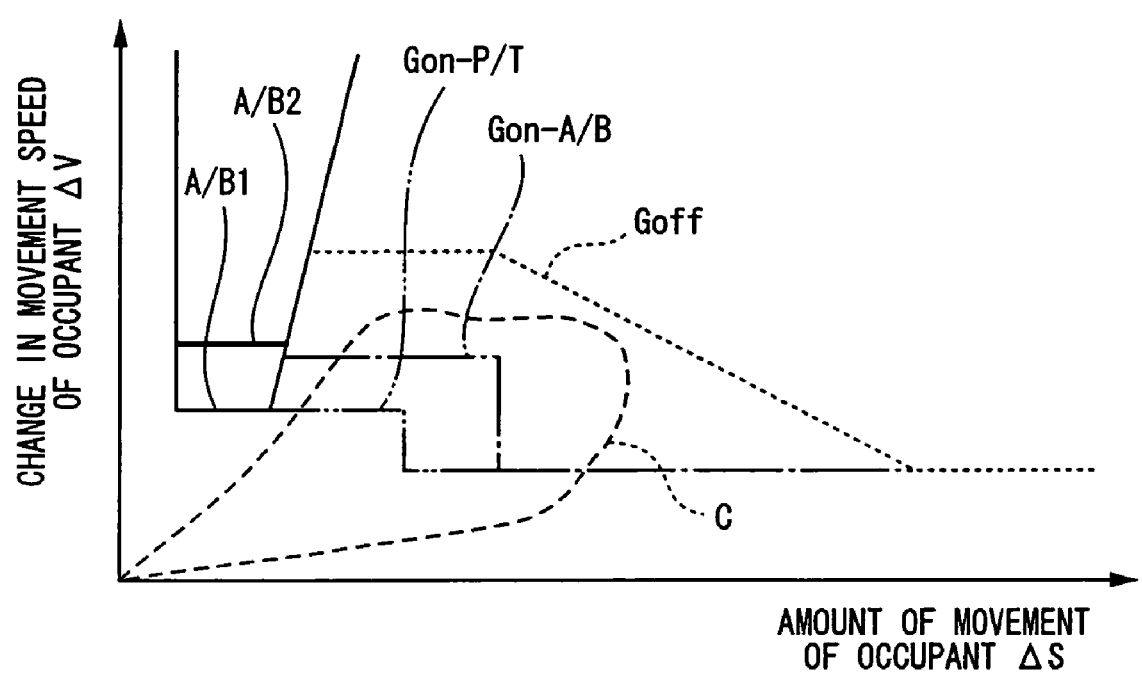
FIG. 3 is a view showing an example of a collision determination threshold value on an S-V map.

For example, on the S-V map shown in FIG. 3, when a collision of a predetermined size is not measured by the front crash sensor 11, a collision determining threshold value Goff (for example, indicated by the dotted line Goff shown in FIG. 3) that specifies whether a slow operation in multiple stages (for example, a slow operation in two stages) of an airbag apparatus and an operation of a seatbelt pretensioner are to be allowed or not allowed is set to a value that specifies that operations of the airbag apparatus and the seatbelt pretensioner are to be allowed in an area where at least the change in movement speed of an occupant ΔV or the amount of movement of the occupant ΔS is a relatively high value, for example, to a value that is high enough to allow low speed collisions, in which the operation of the occupant protection apparatuses is not required (for example, indicated by the broken line C shown in FIG. 3), to be excluded.

In an area where the amount of movement of the occupant ΔS is relatively small and the change in movement speed of an occupant ΔV is relatively large, then, irrespective of the result of the measurement by the front crash sensor 11, respective collision determining threshold values, for example, two collision determining threshold values A/B1 and A/B2 (for example, indicated by the solid line A/B1 and the bold solid line A/B2 shown in FIG. 3) corresponding to each stage that specify whether a rapid operation in multiple stages (for example, a rapid operation in two stages) of the airbag apparatus is to be allowed or not allowed are set. The collision determining threshold value A/B1 that specifies whether a first stage operation of the airbag apparatus is to be allowed or not allowed is set, for example, to a value that is high enough to allow low speed collisions, in which the operation of the occupant protection apparatuses is not required (for example, indicated by the broken line C shown in FIG. 3), to be excluded.

The collision determining threshold value A/B2 that specifies whether a second stage operation of the airbag apparatus is to be allowed or not allowed is set to a value that specifies that the second stage operation of the airbag apparatus is to be allowed in an area where the change in movement speed of an occupant ΔV is a higher value than for the collision determining threshold value A/B1.

In areas other than an area where it is specified that a rapid operation in multiple stages (for example, a rapid operation in two stages) of the airbag apparatus is to be allowed, when a collision of a predetermined size is measured by the front crash sensor 11, a collision determining threshold value Gon-A/B that specifies whether a slow multiple stage operation of an airbag apparatus is to be allowed or not allowed (for example, indicated by the single dot chain line Gon-A/B shown in FIG. 3) and a collision determining threshold value Gon-P/T that specifies whether an operation of the seatbelt pretensioner is to be allowed or not allowed (for example, indicated by the double dot chain line Gon-P/T shown in FIG. 3) are set to values that specify that operations of the airbag apparatus and the seatbelt pretensioner are to be allowed in an area where at least the change in movement speed of an occupant ΔV or the amount of movement of the occupant ΔS becomes a lower value than for the collision determining threshold value Goff (for example, indicated by the dotted line Goff shown in FIG. 3), namely, to values that make it easier to allow operations of the airbag apparatus and the seatbelt pretensioner.

Furthermore, the collision determining threshold value Gon-P/T (for example, indicated by the double dot chain line Gon-P/T shown in FIG. 3) is set to a value that specifies that an operation of the seatbelt pretensioner is to be allowed in an area where at least the change in movement speed of an occupant ΔV or the amount of movement of the occupant ΔS is a lower value than for the collision determining threshold value Gon-A/B (for example, indicated by the single dot chain line Gon-A/B shown in FIG. 3), namely, to a value that makes an operation of the seatbelt pretensioner easier to allow than an operation of the airbag apparatus.

Note that when respective collision determining threshold values A/B1 and A/B2 that correspond to each stage of a multiple stage rapid operation are set for a multiple stage rapid operation of the airbag apparatus, and when it is determined that a correlation between the change in movement speed of an occupant ΔVn and the amount of movement of the occupant ΔSn exceeds the collision determining threshold value A/B1, then a first A/B signal having a true value of "1"

is output to the first A/B AND circuit 28 and the second A/B delay control section 30. When it is determined that this correlation exceeds the collision determining threshold A/B2, then a second A/B signal having a true value of "1" is output to the second A/B delay control section 30.

When, however, only a single collision determining threshold value Gon-A/B is set for a slow multiple stage operation of the airbag apparatus, and it is determined that a correlation between the change in movement speed of an occupant ΔVn and the amount of movement of the occupant ΔSn exceeds the collision determining threshold value Gon-A/B, then, in accordance with the first stage operation, a first A/B signal having a true value of "1" is output to the first A/B AND circuit 28 and the second A/B delay control section 30.

The P/T AND circuit 26 outputs as a P/T signal to the P/T startup signal generating section 27 a signal that is obtained from the logical product of a P/T signal output from the SV determination processing section 25 and a safing signal that is output from a mechanical or electronic type of safing sensor 10a that outputs safing signals having a true value of "1" when, for example, it measures acceleration (or deceleration) of a predetermined value or greater.

The P/T startup signal generating section 27 outputs, in accordance with a P/T signal that is output from the P/T AND circuit 26, a command signal that causes a seatbelt pretensioner to be operated.

The first A/B AND circuit 28 outputs as a first A/B signal to the first A/B startup signal generating section 29 a signal that is obtained from the logical product of a first A/B signal output from the SV determination processing section 25 and a safing signal that is output from the mechanical or electronic type of safing sensor 10a that outputs safing signals having a true value of "1" when, for example, it measures acceleration (or deceleration) of a predetermined value or greater.

The first A/B startup signal generating section 29 outputs, in accordance with a first A/B signal that is output from the first A/B AND circuit 28, a command signal that causes an airbag apparatus to be operated at a first stage.

The second A/B delay control section 30 controls the timing at which the operation of the airbag apparatus is executed at the second stage after the operation at the first stage, namely, controls the timing at which the second A/B signals are output based on the first A/B signals or the first A/B signals and second A/B signals that are output from the SV determination processing section 25.

The second A/B AND circuit 31 outputs as a second A/B signal to the second A/B startup signal generating section 32 a signal that is obtained from the logical product of a second A/B signal output from the second A/B delay control section 30 and a safing signal that is output from the mechanical or electronic type of safing sensor 10a that outputs safing signals having a true value of "1" when, for example, it measures acceleration (or deceleration) of a predetermined value or greater.

The second A/B startup signal generating section 32 outputs, in accordance with a second A/B signal that is output from the second A/B AND circuit 31, a command signal that causes an airbag apparatus to be operated at a second stage.

The collision determining apparatus for a vehicle 10 according to the present embodiment has the above described structure. Next, a description will be given of the operation of the collision determining apparatus for a vehicle 10, and, in particular, of processing to operate the airbag apparatus rapidly or slowly in multiple stages.

Figure 4:
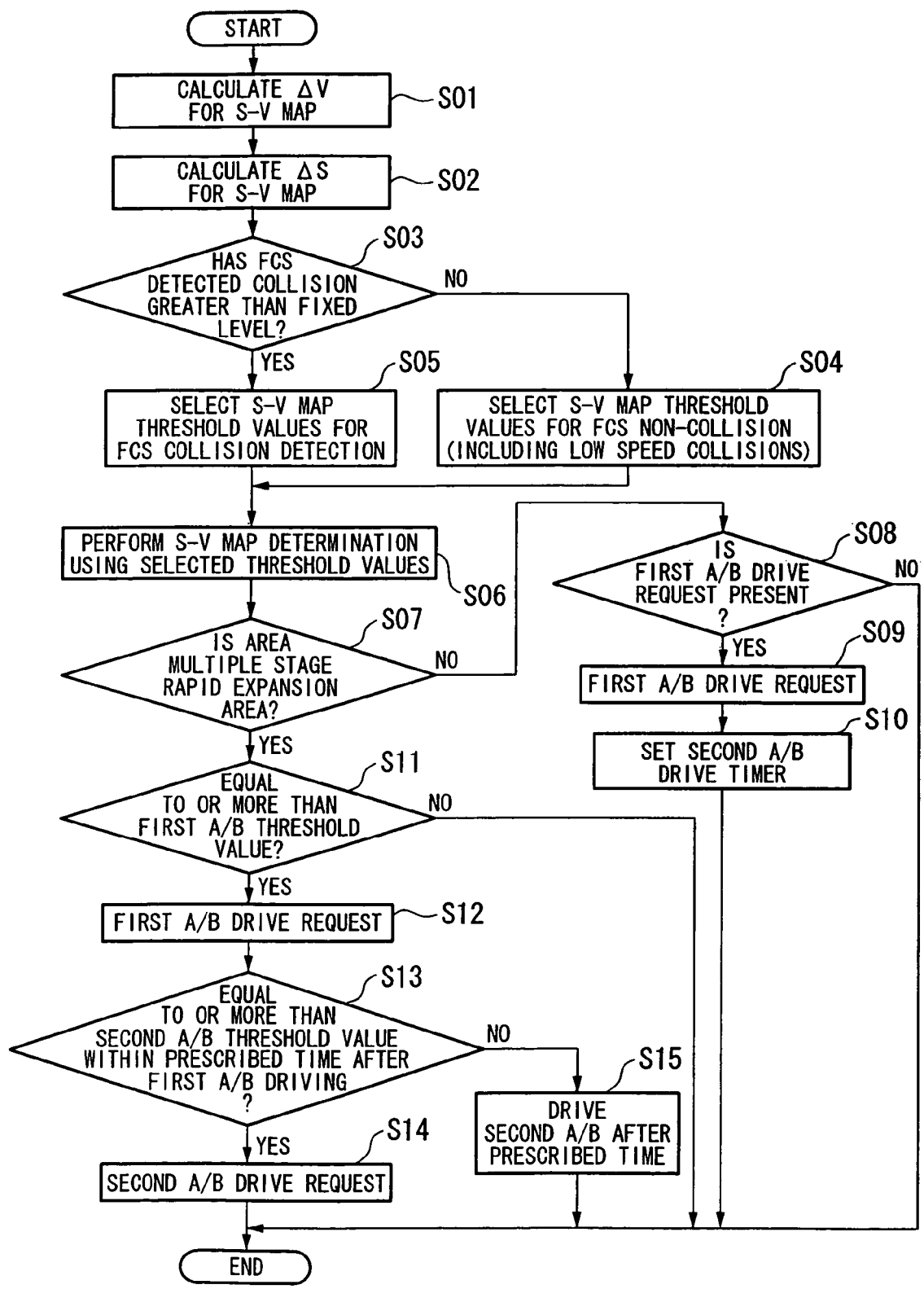
FIG. 4 is a flowchart showing a process for the rapid operation or slow operation of an airbag apparatus in multiple stages.

Firstly, in step S01 shown in FIG. 4, primary integration for time is performed on the acceleration signals G, as shown in Formula (1) above, and a change in movement speed of an occupant ΔVn in a time interval having a predetermined time width n relative to the current time tp (i.e., $tp-n \leq t \leq tp$) is calculated.

Next, in step S02, secondary integration for time is performed on the acceleration signals G, as shown in Formula (2) above, and an amount of movement of an occupant ΔSn in a time interval having a predetermined time width n relative to the current time tp (i.e., $tp-n \leq t \leq tp$) is calculated.

Next, in step S03, a determination is made as to whether or not a collision is detected in which an integral value ΔVFCS obtained by performing the primary integration for time on the acceleration signals output from the front crash sensor 11 is equal to or greater than a predetermined threshold value #ΔVFCS.

When the result of the determination is YES, for example, when a collision such as a frontal high speed collision FH or a high speed offset collision OF is detected, the routine moves to step S05 (described below).

When, however, the result of the determination is NO, for example, when a collision such as a low speed collision FL is detected, the routine moves to step S04.

In step S04, the collision determining threshold value Goff (for example, indicated by the dotted line Goff shown in FIG. 3) that specifies whether an operation of the airbag apparatus and the seatbelt pretensioner is to be allowed or not allowed when a collision of a predetermined size is not measured by the front crash sensor 11, and the respective collision determining threshold values A/B1 and A/B2 (for example, indicated by the solid line A/B1 and the bold solid line A/B2 shown in FIG. 3) that, in accordance with each stage, specify whether a rapid operation in multiple stages (for example, a rapid operation in two stages) of the airbag apparatus is to be allowed or not allowed irrespective of the result of the measurement by the front crash sensor 11 are selected as collision determining threshold values on an S-V map (i.e., S-V Map threshold values), and the routine moves to step S06 (described below).

Moreover, in step S05, the collision determining threshold value Gon-A/B (for example, indicated by the single dot chain line Gon-A/B shown in FIG. 3) that specifies whether a slow operation of the airbag apparatus in multiple stages is to be allowed or not allowed when a collision of a predetermined size is measured by the front crash sensor 11, and the collision determining threshold value Gon-P/T (for example, indicated by the double dot chain line Gon-P/T shown in FIG. 3) that specifies whether an operation of the seatbelt pretensioner is to be allowed or not allowed when a collision of a predetermined size is measured by the front crash sensor 11, as well as the respective collision determining threshold values A/B1 and A/B2 (for example, indicated by the solid line A/B1 and the bold solid line A/B2 shown in FIG. 3) that, in accordance with each stage, specify whether a rapid operation in multiple stages (for example, a rapid operation in two stages) of the airbag apparatus is to be allowed or not allowed irrespective of the result of the measurement by the front crash sensor 11 are selected as collision determining threshold values on an S-V map (i.e., S-V Map threshold values), and the routine moves to step S06 (described below).

In addition, in step S06, a determination is made as to whether or not the correlation on the S-V map between the change in movement speed of an occupant ΔVn input from the ΔVn calculation section 23 and the amount of movement of the occupant ΔSn input from the ΔSn calculation section 24 exceeds the respective collision determining threshold values that is selected.

In step S07, in accordance with the result of the determination in step S06, a determination is made as to whether or not the correlation between the change in movement speed of an occupant $\Delta Vn$ and the amount of movement of the occupant $\Delta Sn$ is in an area where a rapid operation in multiple stages of the airbag apparatus (i.e., a multiple stage rapid expansion) is specified.

When the result of the determination is YES, the routine moves to step S11 (described below).

When, however, the result of the determination is NO, the routine moves to step S08.

In step S08, a determination is made as to whether or not a drive request (i.e., First A/B drive request) for the first stage operation of the slow, multiple stage operation of the airbag apparatus is generated as a result of the correlation on the S-V map between the change in movement speed of an occupant $\Delta Vn$ and the amount of movement of the occupant $\Delta Sn$ exceeding the collision determining threshold Gon-A/B.

When the result of the determination is NO, the processing sequence is ended.

When, however, the result of the determination is YES, the routine moves to step S09, and a command signal (i.e., the First A/B drive request) is output in order to operate the airbag apparatus at the first stage.

Next, in step S10, an operation of a drive timer is started. This drive timer sets the timing at which command signals are output in order to operate the airbag apparatus at the second stage after a predetermined delay time has lapsed since the operation of the airbag apparatus at the first stage. At the point in time when the measurement of a predetermined delay time by the drive timer has ended, a command signal (i.e., Second A/B drive signal) is output in order to operate the airbag apparatus at the second stage. The processing sequence is then ended.

In step S11, a determination is made as to whether or not the correlation on the S-V map between the change in movement speed of an occupant $\Delta Vn$ and the amount of movement of the occupant $\Delta Sn$ is equal to or greater than the collision determining threshold value A/B1 that corresponds to the first stage operation of the multiple stage rapid operation of the airbag apparatus.

When the result of the determination is NO, the processing sequence is ended.

When, however, the result of the determination is YES, the routine moves to step S12, and a command signal is output in order to operate the airbag apparatus at the first stage.

Next, in step S13, a determination is made within a prescribed time (for example, 5 ms) after the first stage operation of the airbag apparatus as to whether or not the correlation on the S-V map between the change in movement speed of an occupant $\Delta Vn$ and the amount of movement of the occupant $\Delta Sn$ is equal to or greater than the collision determining threshold value A/B2 that corresponds to the second stage operation of the multiple stage rapid operation of the airbag apparatus.

When the result of the determination in step S13 is YES, the routine moves to step S14 and a command signal is output immediately in order to operate the airbag apparatus at the second stage. The processing sequence is then ended.

When, however, the result of the determination in step S13 is NO, the routine moves to step S15 and, after a prescribed time has lapsed since the operation of the airbag apparatus at the first stage, a command signal is output in order to operate the airbag apparatus at the second stage. The processing sequence is then ended.

As described above, according to the collision determining apparatus for a vehicle 10 of the present embodiment, by setting the respective collision determining threshold values Goff, Gon-A/B, A/B1, and A/B2 that instruct a slow operation or rapid operation in multiple stages of an airbag apparatus on an S-V map that shows a correlation between an amount of movement of an occupant $\Delta S$ and a change in movement speed of the occupant $\Delta V$, it is possible to reliably ascertain the state of a collision and appropriately operate an occupant protection apparatus in accordance with the state of the collision.

In particular, if there is a possibility that a secondary collision will occur at a timing that is considerably removed from the initial collision occurrence point when the amount of movement of an occupant $\Delta S$ is relatively large even if the change in movement speed of the occupant $\Delta V$ is relatively small, then it is possible to suitably protect an occupant by causing an airbag apparatus to be operated slowly in multiple stages based on the collision determining threshold values Goff and Gon-A/B. Moreover, if there is a possibility that the degree of injury to an occupant will be increased by this secondary collision when the change in movement speed of the occupant $\Delta V$ is relatively large even if the amount of movement of an occupant $\Delta S$ is relatively small, then it is possible to suitably protect an occupant by rapidly operating the airbag apparatus in multiple stages.

Note that, in the above described embodiment, the respective collision determining threshold values corresponding to each stage, for example, the two collision determining threshold values A/B1 and A/B2 that specify whether a multiple stage rapid operation of an airbag apparatus is to be allowed or not allowed are immutable values that do not change irrespective of the results of measurements by the front crash sensor 11, however, the present invention is not limited to this, and it is also possible to alter the respective collision determining threshold values A/B1 and A/B2 in accordance with whether or not a collision of a predetermined size is measured by the front crash sensor 11.

In this case, the respective collision determining threshold values A/B1 and A/B2 when a collision of a predetermined size is measured by the front crash sensor 11 are set to values that specify that the operation of the airbag apparatus is to be allowed, namely, are set to values that make it easier to allow the operation of the airbag apparatus in an area where at least the change in movement speed of the occupant $\Delta V$ is a lower value compared to the respective collision determining threshold values A/B1 and A/B2 when a collision of a predetermined size is not measured by the front crash sensor 11.

The second embodiment of the collision determining apparatus for a vehicle of the present invention will now be described with reference made to FIGS. 5 and 6. Note that component elements that are the same as those already described in the above first embodiment are given the same symbols and a description thereof is omitted.

The electronic control unit 20 of the present embodiment is provided with an acceleration sensor 21, a filter processing section 22, a $\Delta Vn$ calculation section 23, a $\Delta Sn$ calculation section 24, an SV determination processing section 25, a P/T AND circuit 26, a P/T startup signal generating section (second control signal generating device) 27, a first A/B AND circuit 28, a first A/B startup signal generating section (second control signal generating device) 29, a second A/B delay control section 30, a second A/B AND circuit 31, and a second A/B startup signal generating section (second control signal generating device) 32.

The SV determination processing section 25 of the present embodiment outputs a P/T signal having a true value of "1" to the P/T AND circuit 26 when, for example, it is determined that the correlation exceeds the collision determining threshold value for a seatbelt pretensioner. In addition, when it is determined that the correlation exceeds the collision determining threshold value for a one stage operation of an airbag apparatus or the respective collision determining threshold values for each stage of a multiple stage operation (for example, an operation in two stages) of an airbag apparatus, this SV determination processing section 25 outputs a first A/B signal having a true value of "1" that corresponds to the first stage operation to the first A/B AND signal 28 and the second A/B delay control section 30, and outputs a second A/B signal having a true value of "1" that corresponds to the second stage operation to the second A/B delay control section 30.

Note that the aforementioned one stage operation of the airbag apparatus is an operation in which gas is generated by simultaneously igniting a plurality of gas generating agents.

Figure 5:
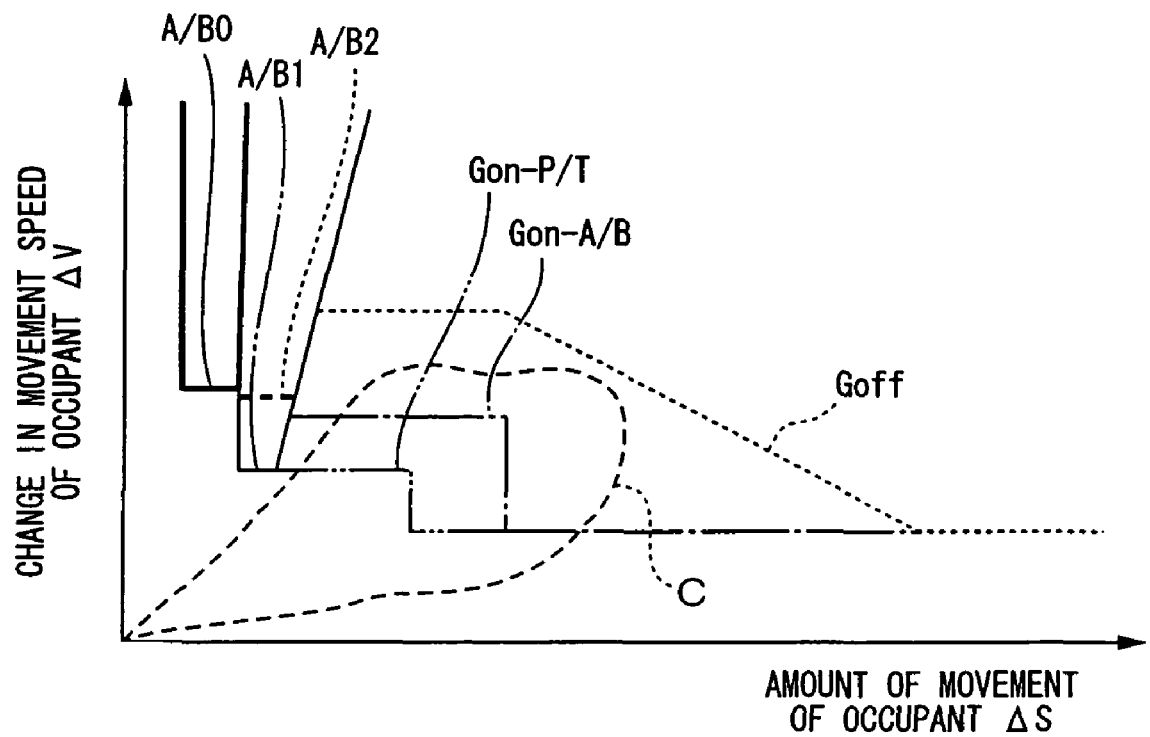
FIG. 5 is a view showing a second embodiment of the collision determining apparatus for a vehicle of the present invention and is a view showing an example of a collision determination threshold value on an S-V map.

For example, on the S-V map shown in FIG. 5, when a collision of a predetermined size is not measured by the front crash sensor 11, a collision determining threshold value Goff (for example, indicated by the dotted line Goff shown in FIG. 5) that specifies whether a slow, multiple stage operation (for example, a slow operation in two stages) of an airbag apparatus and an operation of a seatbelt pretensioner is to be allowed or not allowed is set to a value that specifies that operations of the airbag apparatus and the seatbelt pretensioner are to be allowed in an area where at least the change in movement speed of an occupant ΔV or the amount of movement of the occupant ΔS is a relatively high value, for example, to a value that is high enough to allow low speed collisions, in which the operation of the occupant protection apparatuses is not required (for example, indicated by the broken line C shown in FIG. 5), to be excluded.

In an area where the amount of movement of the occupant ΔS is relatively small and the change in movement speed of an occupant ΔV is relatively large, then, irrespective of the results of the measurement by the front crash sensor 11, respective collision determining threshold values, for example, two collision determining threshold values A/B1 and A/B2 (for example, indicated by the solid line A/B1 and the bold dotted line A/B2 shown in FIG. 5) corresponding to each stage that specify whether a rapid operation in multiple stages (for example, a rapid operation in two stages) of the airbag apparatus is to be allowed or not allowed are set. The collision determining threshold value A/B1 that specifies whether a first stage operation of the airbag apparatus is to be allowed or not allowed is set, for example, to a value that is high enough to allow low speed collisions, in which the operation of the occupant protection apparatuses is not required (for example, indicated by the broken line C shown in FIG. 5), to be excluded. In addition, the collision determining threshold value A/B2 that specifies whether a second stage operation of the airbag apparatus is to be allowed or not allowed is set to a value that specifies that the second stage operation of the airbag apparatus is to be allowed in an area where the change in movement speed of an occupant ΔV is a higher value than for the collision determining threshold value A/B1.

Furthermore, in an area where the amount of movement of the occupant ΔS is relatively small in comparison with an area where it is specified that a rapid operation in multiple stages (for example, a rapid operation in two stages) of the airbag apparatus is allowed, then, irrespective of the results of the measurement by the front crash sensor 11, a collision determining threshold value A/B0 (for example, indicated by the bold solid line A/B0 shown in FIG. 5) that specifies whether a rapid one stage operation of the airbag apparatus is to be allowed or not allowed is set.

Moreover, in areas other than areas where it is specified that a rapid operation of the airbag apparatus is to be allowed, when a collision of a predetermined size is measured by the front crash sensor 11, a collision determining threshold value Gon-A/B that specifies whether a slow multiple stage operation of an airbag apparatus is to be allowed or not allowed (for example, indicated by the single dot chain line Gon-A/B shown in FIG. 5) and a collision determining threshold value Gon-P/T that specifies whether an operation of the seatbelt pretensioner is to be allowed or not allowed (for example, indicated by the double dot chain line Gon-P/T shown in FIG. 5) are set to values that specify that operations of the airbag apparatus and the seatbelt pretensioner are to be allowed in an area where at least the change in movement speed of an occupant ΔV or the amount of movement of the occupant ΔS becomes a lower value than for the collision determining threshold value Goff (for example, indicated by the dotted line Goff shown in FIG. 5), namely, to values that make it easier to allow operations of the airbag apparatus and the seatbelt pretensioner.

Furthermore, the collision determining threshold value Gon-P/T (for example, indicated by the double dot chain line Gon-P/T shown in FIG. 5) is set to a value that specifies that an operation of the seatbelt pretensioner is to be allowed in an area where at least the change in movement speed of an occupant ΔV or the amount of movement of the occupant ΔS is a lower value than for the collision determining threshold value Gon-A/B (for example, indicated by the single dot chain line Gon-A/B shown in FIG. 5), namely, to a value that makes an operation of the seatbelt pretensioner easier to allow than an operation of the airbag apparatus.

The collision determining apparatus for a vehicle 10 according to the present embodiment has the above described structure. Next, a description will be given of the operation of the collision determining apparatus for a vehicle 10, and, in particular, of processing to operate the airbag apparatus rapidly or slowly in one stage.

Figure 6:
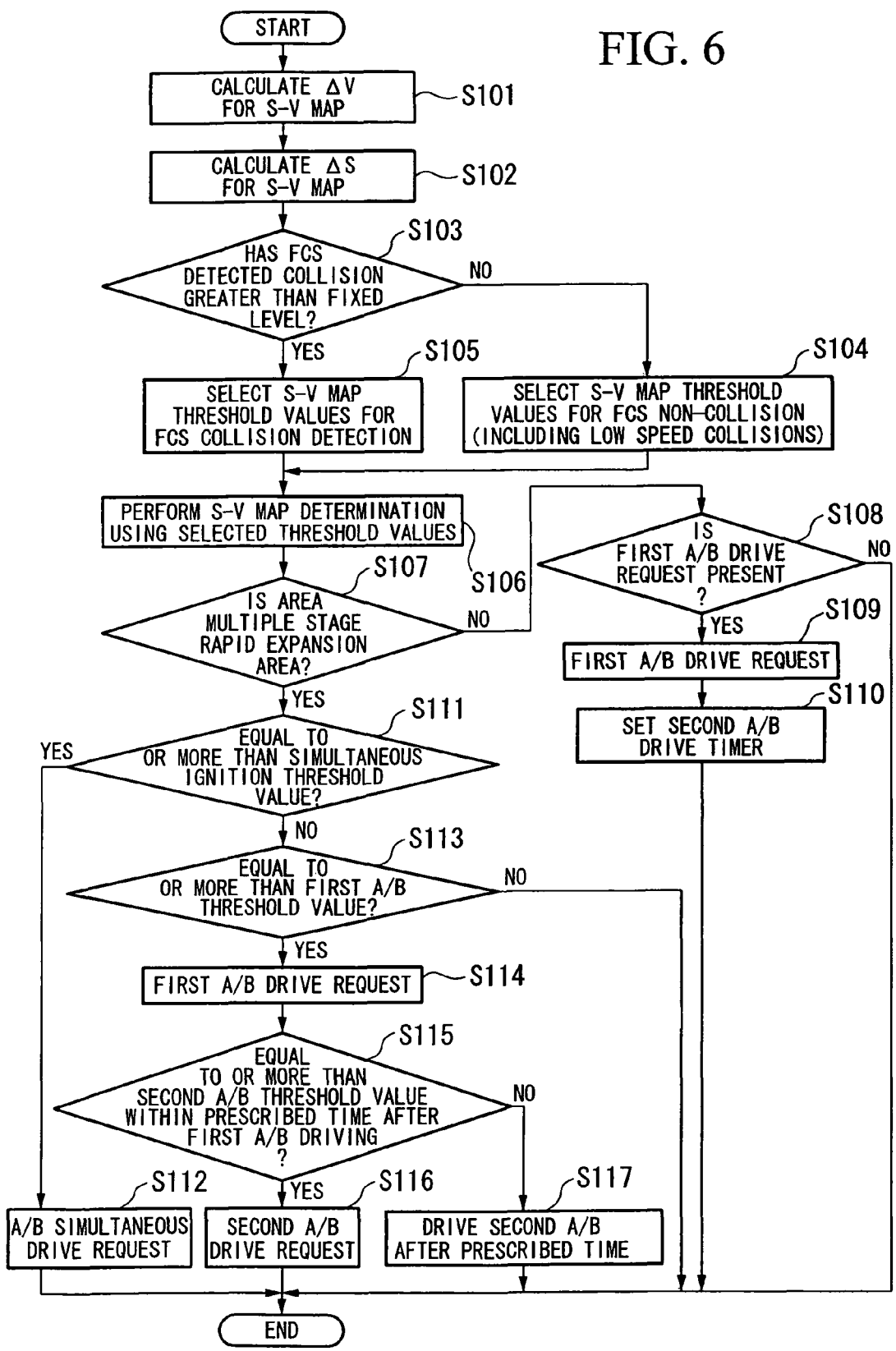
FIG. 6 is a flowchart showing a process to operate an airbag rapidly apparatus in multiple stages or to operate an airbag apparatus slowly in multiple stages.

Firstly, in step S101 shown in FIG. 6, primary integration for time is performed on the acceleration signals G, as shown in Formula (1) above, and a change in movement speed of an occupant ΔVn in a time interval having a predetermined time width n relative to the current time tp (i.e., $tp-n \leq t \leq tp$) is calculated.

Next, in step S102, secondary integration for time is performed on the acceleration signals G, as shown in Formula (2) above, and an amount of movement of an occupant ΔSn in a time interval having a predetermined time width n relative to the current time tp (i.e., $tp-n \leq t \leq tp$) is calculated.

Next, in step S103, a determination is made as to whether or not a collision is detected in which an integral value ΔVFCS that is obtained by performing the primary integration for time on the acceleration signals output from the front crash sensor 11 is equal to or greater than a predetermined threshold value #ΔVFCS.

If the result of the determination is YES, for example, when a collision such as a frontal high speed collision FH or a high speed offset collision OF is detected, the routine moves to step S105 (described below).

When, however, the result of the determination is NO, for example, when a collision such as a low speed collision FL is detected, the routine moves to step S104.

In step S104, the collision determining threshold value Goff (for example, indicated by the dotted line Goff shown in FIG. 5) that specifies whether an operation of the airbag apparatus and the seatbelt pretensioner is to be allowed or not allowed when a collision of a predetermined size is not measured by the front crash sensor 11, and the respective collision determining threshold values A/B1 and A/B2 (for example, indicated by the solid line A/B1 and the bold solid line A/B2 shown in FIG. 5) that, in accordance with each stage, specify whether a rapid operation in multiple stages (for example, a rapid operation in two stages) of the airbag apparatus is to be allowed or not allowed irrespective of the result of the measurement by the front crash sensor 11 are selected as collision determining threshold values on an S-V map (i.e., S-V Map threshold values), and the routine moves to step S106 (described below).

Moreover, in step S105, the collision determining threshold value Gon-A/B (for example, indicated by the single dot chain line Gon-A/B shown in FIG. 5) that specifies whether a slow operation of the airbag apparatus in multiple stages is to be allowed or not allowed when a collision of a predetermined size is measured by the front crash sensor 11, and the collision determining threshold value Gon-P/T (for example, indicated by the double dot chain line Gon-P/T shown in FIG. 5) that specifies whether an operation of the seatbelt pretensioner is to be allowed or not allowed when a collision of a predetermined size is measured by the front crash sensor 11, as well as the respective collision determining threshold values A/B1 and A/B2 (for example, indicated by the solid line A/B1 and the bold solid line A/B2 shown in FIG. 5) that, in accordance with each stage, specify whether a rapid operation in multiple stages (for example, a rapid operation in two stages) of the airbag apparatus is to be allowed or not allowed irrespective of the result of the measurement by the front crash sensor 11 are selected as collision determining threshold values on an S-V map (i.e., S-V Map threshold values), and the routine moves to step S106 (described below).

In addition, in step S106, a determination is made as to whether or not the correlation on the S-V map between the change in movement speed of an occupant $\Delta Vn$ input from the $\Delta Vn$ calculation section 23 and the amount of movement of the occupant $\Delta Sn$ input from the $\Delta Sn$ calculation section 24 exceeds the respective collision determining threshold values that is selected.

In step S107, in accordance with the result of the determination in step S106, a determination is made as to whether or not the correlation between the change in movement speed of an occupant $\Delta Vn$ and the amount of movement of the occupant $\Delta Sn$ is in an area where a rapid operation in multiple stages of the airbag apparatus (i.e., a multiple stage rapid expansion) is specified.

When the result of the determination is YES, the routine moves to step S111 (described below).

When, however, the result of the determination is NO, the routine moves to step S108.

In step S108, a determination is made as to whether or not a drive request (i.e., First A/B drive request) for the first stage operation of the slow, multiple stage operation of the airbag apparatus is generated as a result of the correlation on the S-V map between the change in movement speed of an occupant $\Delta Vn$ and the amount of movement of the occupant $\Delta Sn$ exceeding the collision determining threshold Gon-A/B.

When the result of the determination is NO, the processing sequence is ended.

When, however, the result of the determination is YES, the routine moves to step S109, and a command signal (i.e., the First A/B drive request) is output in order to operate the airbag apparatus at the first stage.

Next, in step S110, an operation of a drive timer is started. This drive timer sets the timing at which command signals are output in order to operate the airbag apparatus at the second stage after a predetermined delay time has lapsed since the operation of the airbag apparatus at the first stage. At the point in time when the measurement of a predetermined delay time by the drive timer has ended, a command signal (i.e., Second A/B drive signal) is output in order to operate the airbag apparatus at the second stage. The processing sequence is then ended.

In step S111, a determination is made as to whether or not the correlation on the S-V map between the change in movement speed of an occupant $\Delta Vn$ and the amount of movement of the occupant $\Delta Sn$ is equal to or greater than the collision determining threshold value A/B0 that corresponds to a rapid operation in a single stage of the airbag apparatus.

When the result of the determination is NO, the processing sequence moves to step S113 (described below).

When, however, the result of the determination is YES, the routine moves to step S112.

In step S112, a command signal is output in order to perform a rapid operation of the airbag apparatus in one stage, for example, a command signal instructing that the respective operations of the first stage and second stage of the airbag apparatus be executed simultaneously is output, and the processing sequence is ended.

In step S113, a determination is made as to whether or not the correlation on the S-V map between the change in movement speed of an occupant $\Delta Vn$ and the amount of movement of the occupant $\Delta Sn$ is equal to or greater than the collision determining threshold value A/B1 that corresponds to the operation of the first stage of a rapid operation in multiple stages of the airbag apparatus.

When the result of the determination is NO, the processing sequence is ended.

When, however, the result of the determination is YES, the routine moves to step S114 and a command signal is output in order to operate the airbag apparatus at the first stage.

Next, in step S115, a determination is made within a prescribed time (for example, 5 ms) after the first stage operation of the airbag apparatus as to whether or not the correlation on the S-V map between the change in movement speed of an occupant $\Delta Vn$ and the amount of movement of the occupant $\Delta Sn$ is equal to or greater than the collision determining threshold value A/B2 that corresponds to the operation at the second stage of the multiple stage rapid operation of the airbag apparatus. 5 When the result of the determination in step S115 is YES, the routine moves to step S116 and a command signal (i.e., Second A/B drive request) is output immediately in order to operate the airbag apparatus at the second stage. The processing sequence is then ended.

When, however, the result of the determination in step S115 is NO, the routine moves to step S117 and, after a prescribed time has lapsed since the operation of the airbag apparatus at the first stage, a command signal is output in order to operate the airbag apparatus at the second stage and the processing sequence is then ended.

As described above, according to the collision determining apparatus for a vehicle 10 of the present embodiment, by setting the respective collision determining threshold values Goff, Gon-A/B, A/B1, A/B2, and A/B0 that instruct a slow operation in multiple stages, or a rapid operation in multiple stages, or a rapid operation in one stage of an airbag apparatus on an S-V map that shows a correlation between an amount of movement of an occupant $\Delta S$ and a change in movement speed of the occupant $\Delta V$, it is possible to ascertain the state of a collision with reliability and accuracy and to appropriately operate an occupant protection apparatus in accordance with the state of the collision.

In particular, if there is a possibility that a secondary collision will occur at a timing that is considerably removed from the initial collision occurrence point when the amount of movement of an occupant $\Delta S$ is relatively large even if the change in movement speed of the occupant $\Delta V$ is relatively small, then it is possible to suitably protect an occupant by slowly operating an airbag apparatus in multiple stages based on the collision determining threshold values Goff and Gon-A/B. Moreover, if there is a possibility that the degree of injury to an occupant will be increased by this secondary collision when the change in movement speed of the occupant $\Delta V$ is relatively large even if the amount of movement of an occupant $\Delta S$ is relatively small, then it is possible to suitably protect an occupant by rapidly operating the airbag apparatus in multiple stages. Furthermore, if there is a possibility that the degree of injury to an occupant arising from this secondary collision will become excessively high when the change in movement speed of the occupant $\Delta V$ is relatively large even if the amount of movement of an occupant $\Delta S$ is relatively extremely minute, then it is possible to suitably protect an occupant by rapidly operating the airbag apparatus in a single stage.

Note that, in the above described embodiment, the collision determining threshold value A/B0 that specifies whether a rapid operation in a single stage of the airbag apparatus is to be allowed or not allowed, as well as the respective collision determining threshold values corresponding to each stage, for example, the two collision determining threshold values A/B1 and A/B2 that specify whether a rapid operation in multiple stages of an airbag apparatus is to be allowed or not allowed are immutable values that do not change irrespective of the results of measurement by the front crash sensor 11, however, the present invention is not limited to this, and it is also possible to alter the respective collision determining threshold values A/B0, A/B1, and A/B2 in accordance with whether or not a collision of a predetermined size is measured by the front crash sensor 11.

In this case, the respective collision determining threshold values A/B0, A/B1, and A/B2 when a collision of a predetermined size is measured by the front crash sensor 11 are set to values that specify that the operation of the airbag apparatus is to be allowed, namely, are set to values that make it easier to allow the operation of the airbag apparatus in an area where at least the change in the rate of movement of the occupant $\Delta V$ is a lower value compared to the respective collision determining threshold values A/B0, A/B1, and A/B2 when a collision of a predetermined size is not measured by the front crash sensor 11.

The third embodiment of the collision determining apparatus for a vehicle of the present invention will now be described with reference made to FIGS. 7 through 17. Note that component elements that are the same as those already described in the above first and second embodiments are given the same symbols and a description thereof is omitted.

Figure 7:
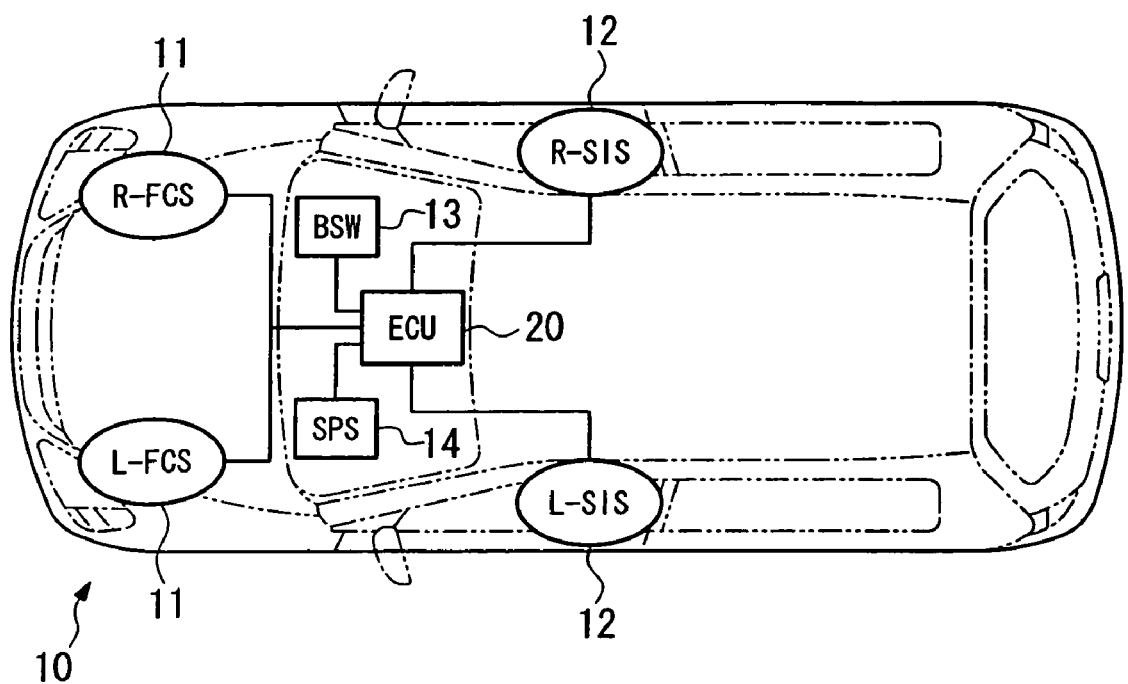
FIG. 7 is a view showing a third embodiment of the collision determining apparatus for a vehicle of the present invention and is a schematic view of a vehicle equipped with the collision determining apparatus for a vehicle.

As shown in FIG. 7, a collision determining apparatus for a vehicle 10 of the present embodiment is provided with a plurality of satellite sensors, a buckle switch (engagement state detecting device (BSW)) 13 that detects the engagement state of a seatbelt of an occupant, a seat position sensor (seat position detecting device (SPS)) 14 that detects the position of a seat, and an electronic control unit (ECU) 20 that is located in the center of the vehicle. The satellite sensors are formed by a plurality of acceleration sensors, for example, two front crash sensors (i.e., L-FCS and R-FCS) 11 that are located at a right front portion and a left front portion of the vehicle, and two side impact sensors (i.e., L-SIS and R-SIS) 12 that are located at a right side portion and a left side portion of the vehicle. Acceleration signals that are output from the respective satellite sensors are input into the electronic control unit 20.

Figure 8:
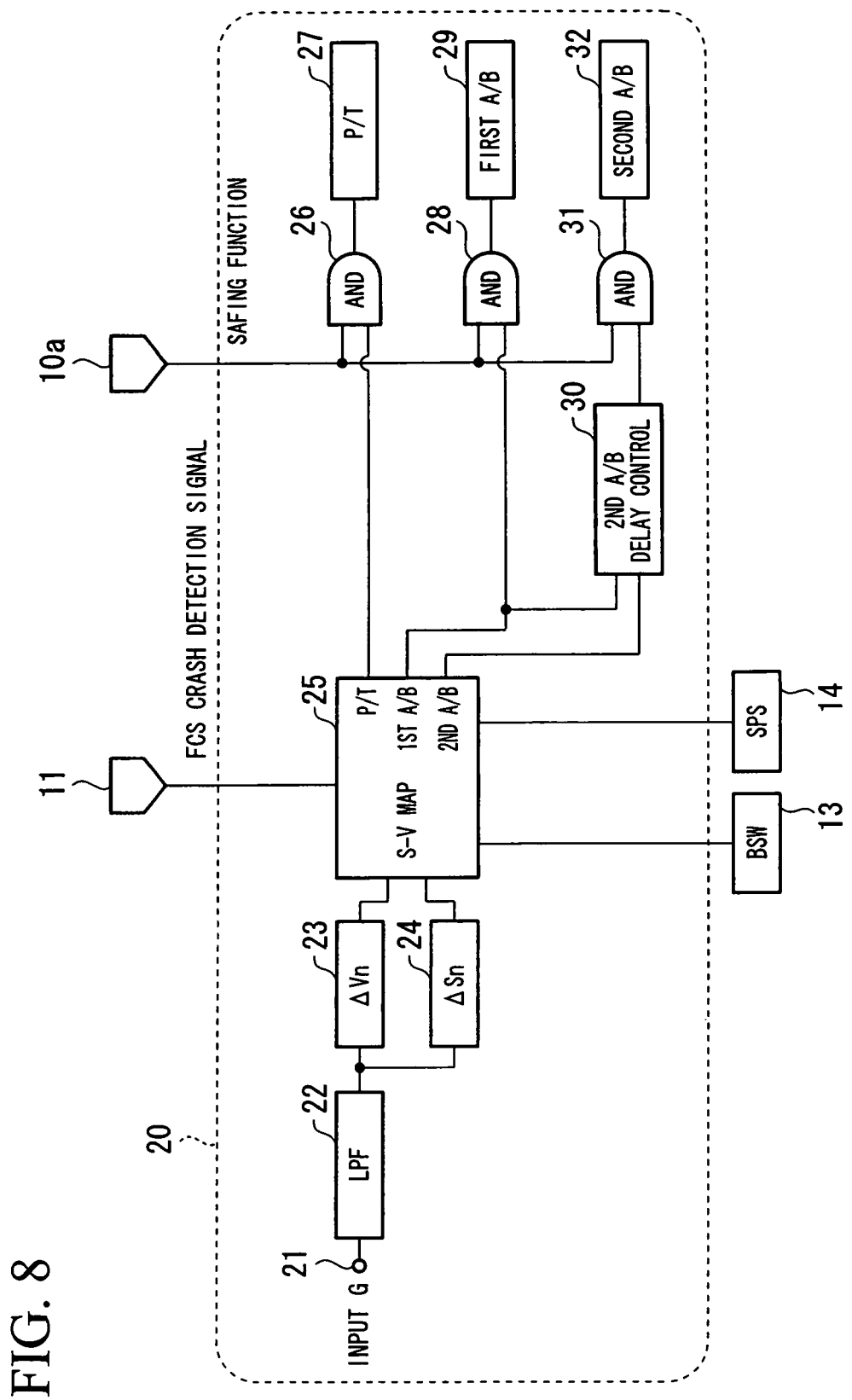
FIG. 8 is a block diagram of the third embodiment of the collision determining apparatus for a vehicle.

As shown in FIG. 8, the electronic control unit 20 is provided with an acceleration sensor (i.e., a G sensor) 21, a filter processing section 22, a $\Delta Vn$ calculation section 23, a $\Delta Sn$ calculation section 24, an SV determination processing section 25, a P/T AND circuit 26, a P/T startup signal generating section (third control signal generating device) 27, a first A/B AND circuit 28, a first A/B startup signal generating section (third control signal generating device) 29, a second A/B delay control section 30, a second A/B AND circuit 31, and a second A/B startup signal generating section (third control signal generating device) 32.

The SV determination processing section 25 sets, for a plurality of different occupant protection apparatuses such as, for example, airbags and seatbelt pretensioners, collision determination threshold values, which are boundary values of respective areas that specify whether each operation is possible or not possible for a plurality of operating states of a vehicle protection apparatus, on an S-V map that shows a correlation between a change in movement speed of an occupant $\Delta V$ and the amount of movement by the occupant $\Delta S$ (for example, rectangular coordinates that take the amount of movement by the occupant $\Delta S$ as the horizontal axis and the change in movement speed of an occupant $\Delta V$ as the vertical axis) while referring to determination results that show whether or not a collision of a predetermined size is measured by the satellite sensors (for example, by the front crash sensors (L-FCS or R-FCS) 11), on determination results that show a state of engagement or a state of non-engagement of the seatbelt which is determined based on detection results from the buckle switch (BSW) 13, and on determination results that show a forward position or rearward position of the seat which is determined based on detection results from the seat position sensor (SPS) 14. In addition, the SV determination processing section 25 determines for each occupant protection apparatus whether or not the correlation between the change in movement speed of an occupant $\Delta Vn$ that is input from the $\Delta Vn$ calculation section 23 and the amount of movement of the occupant $\Delta Sn$ that is input from the $\Delta Sn$ calculation section 24 exceeds a predetermined collision determination threshold value. For example, when it is determined that the correlation exceeds the collision determination threshold value for a seatbelt pretensioner, a P/T signal having a true value of "1" is output to the P/T AND circuit 26. Moreover, when it is determined that the correlation exceeds the respective collision determination threshold values corresponding to each stage of an operation in multiple stages (for example, an operation in two stages) of, for example, an airbag apparatus, then a first A/B signal having a true value of "1" corresponding to the first stage of the operation is output to the first A/B AND circuit 28 and to the second A/B delay control section 30, and a second A/B signal having a true value of "1" corresponding to the second stage of the operation is output to the second A/B delay control circuit 30.

Figure 9:
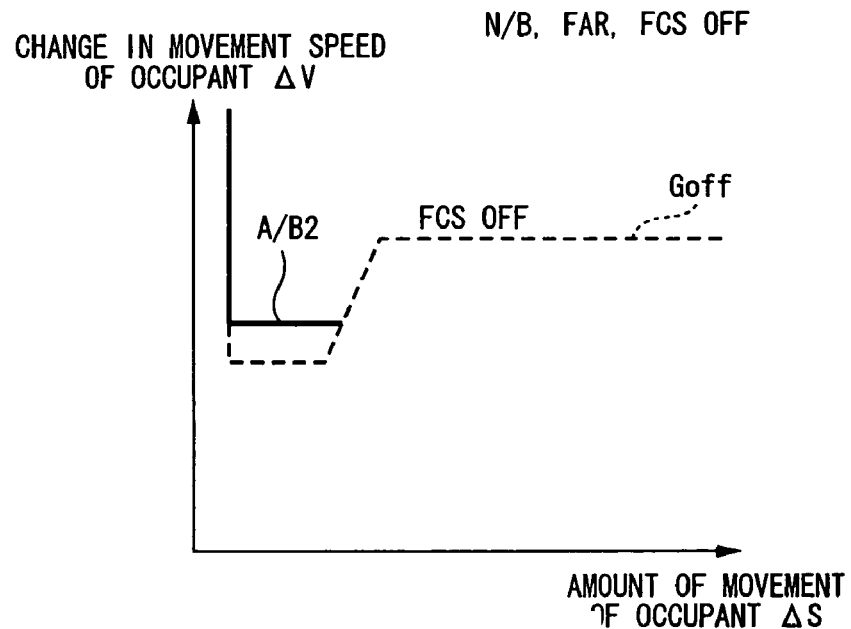
FIGS. 9 to 16 are views showing an example of a collision determination threshold values on S-V maps.

For example, on the S-V map shown in FIG. 9, when the seatbelt is in a non-engaged state (N/B), and the seat position is at the rear (Far), and a collision of a predetermined size is not measured by the front crash sensor 11 (FCS OFF), then a collision determining threshold value Goff (for example, indicated by the dotted line Goff shown in FIG. 9) that specifies whether the operation of the first stage of a multiple stage operation (for example, an operation in two stages) of an airbag apparatus and an operation of a seatbelt pretensioner are to be allowed or not allowed is set to a value that specifies that operations of the airbag apparatus and the seatbelt pretensioner are to be allowed in an area where at least the change in movement speed of an occupant $\Delta V$ or the amount of movement of the occupant $\Delta S$ is a relatively high value, for example, to a value that is high enough to allow low speed collisions, in which the operation of the occupant protection apparatuses is not required, to be excluded.

In an area where the amount of movement of the occupant $\Delta S$ is relatively small and the change in movement speed of an occupant $\Delta V$ is relatively large, then, irrespective of the results of the measurement by the front crash sensor 11, the collision determining threshold value A/B2 (for example, indicated by the solid line A/B2 shown in FIG. 9) that specifies whether the operation of the second stage of a multiple stage operation (for example, an operation in two stages) of the airbag apparatus is to be allowed or not allowed are set.

Here, when it is determined that the correlation between a change in movement speed of an occupant $\Delta Vn$ and the amount of movement by the occupant $\Delta Sn$ exceeds the collision determining threshold value Goff, then a P/T signal having a true value of "1" is output to the P/T AND circuit 26, and a first A/B signal having a true value of "1" is output to the first A/B AND circuit 28 and to the second A/B control delay control circuit 30.

Furthermore, when it is determined that the correlation between a change in movement speed of an occupant $\Delta Vn$ and the amount of movement by the occupant $\Delta Sn$ exceeds the collision determining threshold value A/B2 within a prescribed time after the operation at the first stage of the airbag apparatus, or when a predetermined delay time has passed since it was determined that the correlation between a change in movement speed of an occupant $\Delta Vn$ and the amount of movement by the occupant $\Delta Sn$ did not exceed the collision determining threshold value A/B2 within a prescribed time after the operation at the first stage of the airbag apparatus, then a second A/B signal having a true value of "1" is output to the second A/B delay control section 30.

Figure 10:
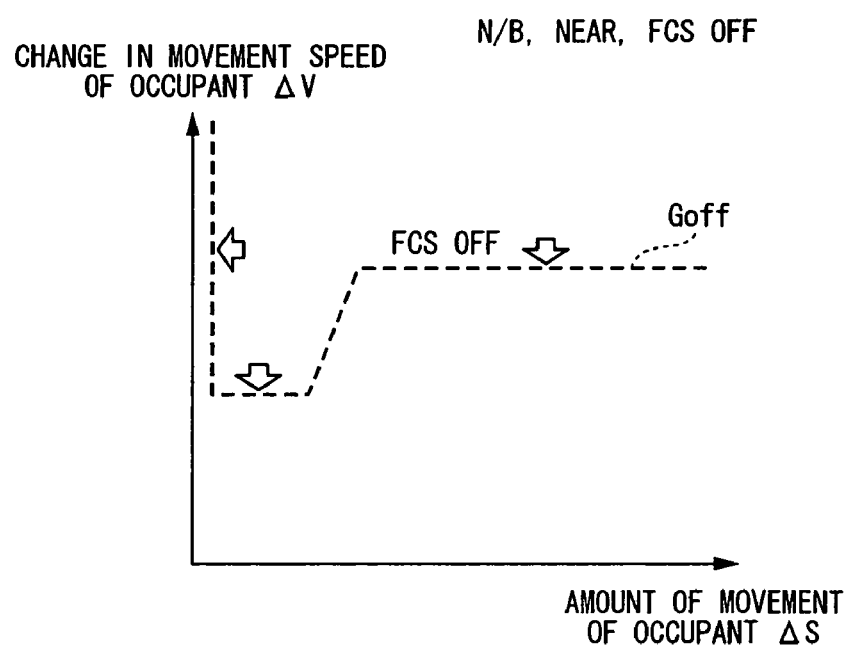

Moreover, in contrast to when the seatbelt is in a non-engaged state (N/B), and the seat position is at the rear (Far), and a collision of a predetermined size is not measured by the front crash sensor 11 (FCS OFF) as shown in FIG. 9, when it is detected that the seat is in a forward position (Near), for example, as shown in FIG. 10, the collision determining threshold value Goff is set to a value that specifies that operations of the airbag apparatus and seatbelt pretensioner are to be allowed in an area where at least the change in movement speed of an occupant $\Delta V$ or the amount of movement by the occupant $\Delta S$ is a lower value, namely, is set to a value that makes it easier to allow the operations of the airbag apparatus and seatbelt pretensioner.

In this case, when, for example, the collision determining threshold value A/B2 shown in FIG. 9 is omitted and it is determined that the correlation between a change in movement speed of an occupant $\Delta Vn$ and the amount of movement by the occupant $\Delta Sn$ exceeds the collision determining threshold value Goff, a P/T signal having a true value of "1" is output to the P/T AND circuit 26 and a first A/B signal having a true value of "1" is output to the first A/B AND circuit 28 and the second A/B delay control section 30. In addition, after a predetermined delay time has passed since the first stage operation of the airbag apparatus, a second A/B signal having a true value of "1" is output to the second A/B delay control section 30.

Figure 11:
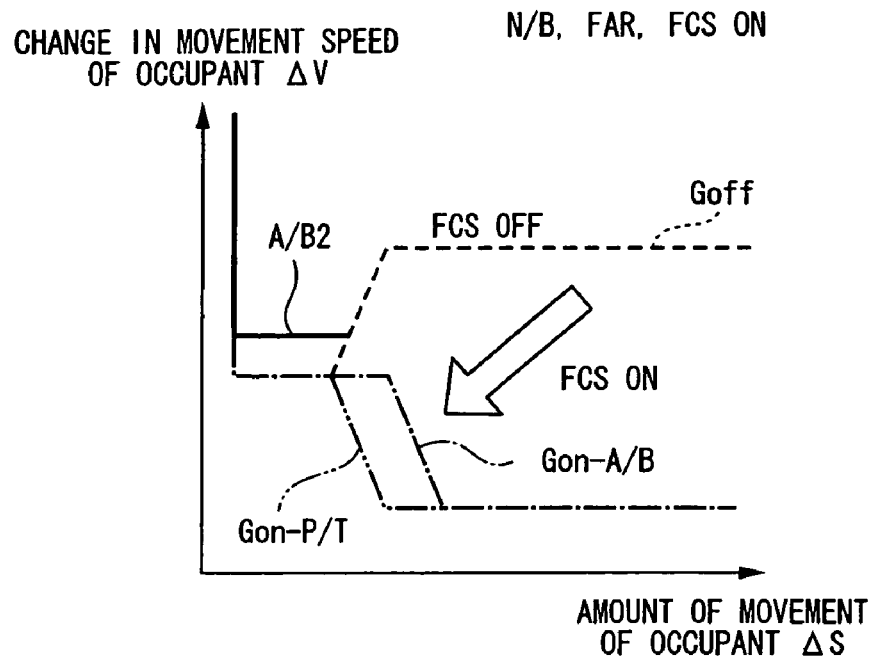

Moreover, in contrast to when the seatbelt is in a non-engaged state (N/B), and the seat position is at the rear (Far), and a collision of a predetermined size is not measured by the front crash sensor 11 (FCS OFF) as shown in FIG. 9, when a collision of a predetermined size is measured by the front crash sensor 11 (FCS ON), for example, as shown in FIG. 11, the collision determining threshold value Goff is altered to a collision determining threshold value Gon-A/B (for example, indicated by the single dot chain line Gon-A/B shown in FIG. 11) that specifies that a first stage operation of a multiple stage operation (for example, an operation in two stages) of an airbag apparatus is to be allowed or not allowed and a collision determining threshold value Gon-P/T (for example, indicated by the double dot chain line Gon-P/T shown in FIG. 11) that specifies whether an operation of the seatbelt pretensioner is to be allowed or not allowed. The collision determining threshold value Gon-A/B and the collision determining threshold value Gon-P/T are set to values that specify that operations of the airbag apparatus and seatbelt pretensioner are to be allowed in an area where at least the change in movement speed of an occupant $\Delta V$ or the amount of movement by the occupant $\Delta S$ is a lower value compared to the collision determining threshold value Goff, namely, are set to values that make it easier to allow the operations of the airbag apparatus and seatbelt pretensioner.

Figure 12:
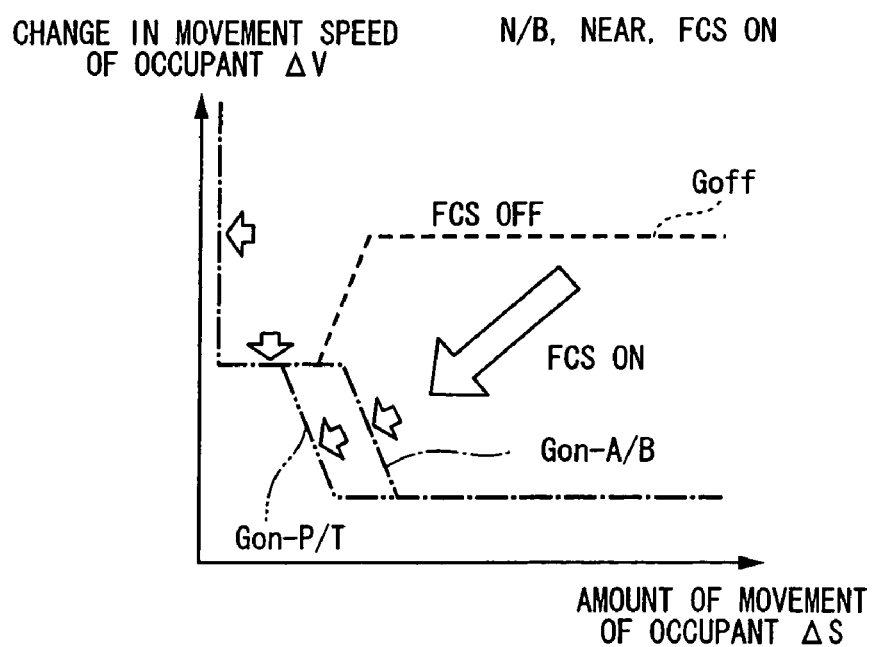

Moreover, in contrast to when the seatbelt is in a non-engaged state (N/B), and the seat position is at the rear (Far), and a collision of a predetermined size is measured by the front crash sensor 11 (FCS ON as shown in FIG. 11, when it is detected that the seat position is forward (Near), then, for example, as shown in FIG. 12, the collision determining threshold value Gon-A/B and the collision determining threshold value Gon-P/T are set to values that specify that operations of the airbag apparatus and seatbelt pretensioner are to be allowed in an area where at least the change in movement speed of an occupant $\Delta V$ or the amount of movement by the occupant $\Delta S$ is a lower value, namely, are set to values that make it easier to allow the operations of the airbag apparatus and seatbelt pretensioner.

In this case, when, for example, the collision determining threshold value A/B2 shown in FIG. 11 is omitted and it is determined that the correlation between a change in movement speed of an occupant $\Delta Vn$ and the amount of movement by the occupant $\Delta Sn$ exceeds the collision determining threshold value Gon-A/B, a first A/B signal having a true value of "1" is output to the first A/B AND circuit 28 and the second A/B delay control section 30. In addition, after a predetermined delay time has passed since the first stage operation of the airbag apparatus, a second A/B signal having a true value of "1" is output to the second A/B delay control section 30.

Figure 13:
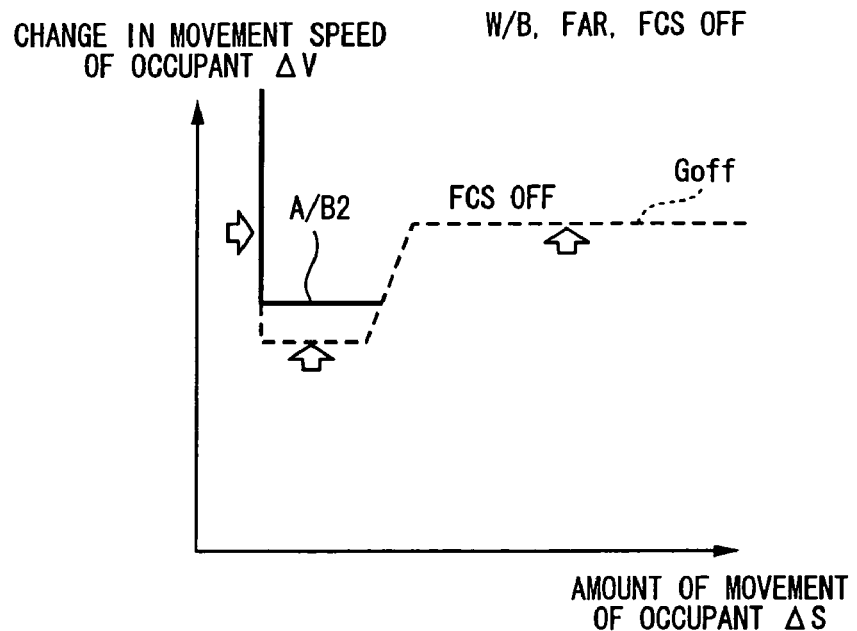

Moreover, in contrast to when the seatbelt is in a non-engaged state (N/B), and the seat position is at the rear (Far), and a collision of a predetermined size is not measured by the front crash sensor 11 (FCS OFF) as shown in FIG. 9, when it is detected that the seat belt is in an engaged state (W/B), then, for example, as shown in FIG. 13, the collision determining threshold value Goff and the collision determining threshold value A/B2 are set to values that specify that operations of the airbag apparatus and seatbelt pretensioner are to be allowed in an area where at least the change in movement speed of an occupant $\Delta V$ or the amount of movement by the occupant $\Delta S$ is a higher value, namely, are set to values that make it more difficult to allow the operations of the airbag apparatus and seatbelt pretensioner.

Figure 14:
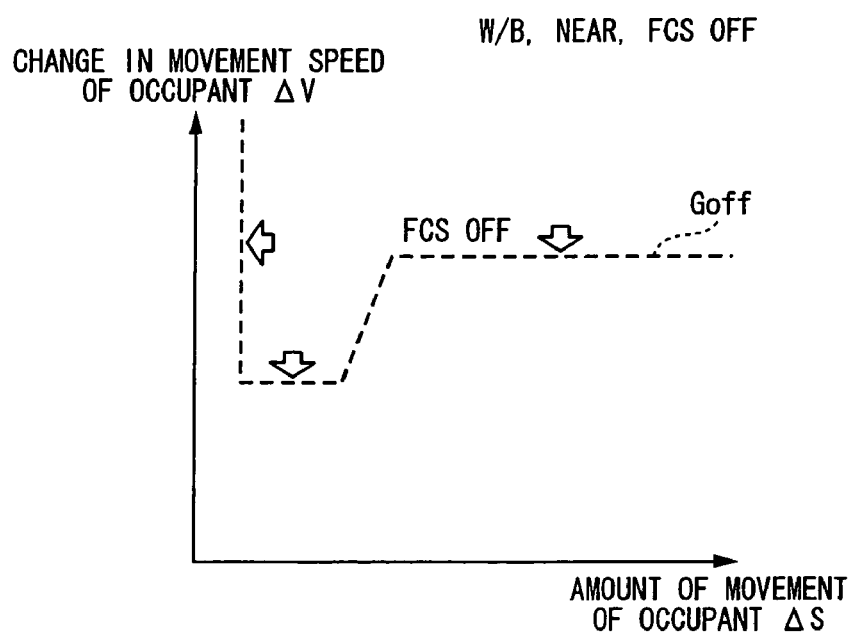

Moreover, in contrast to when the seatbelt is in an engaged state (W/B), and the seat position is at the rear (Far), and a collision of a predetermined size is not measured by the front crash sensor 11 (FCS OFF) as shown in FIG. 13, when it is detected that the seat is in a forward position (Near), for example, as shown in FIG. 14, the collision determining threshold value Goff is set to a value that specifies that operations of the airbag apparatus and seatbelt pretensioner are to be allowed in an area where at least the change in movement speed of an occupant $\Delta V$ or the amount of movement by the occupant ΔS is a lower value, namely, is set to a value that makes it easier to allow the operations of the airbag apparatus and seatbelt pretensioner.

In this case, when, for example, the collision determining threshold value A/B2 shown in FIG. 13 is omitted and it is determined that the correlation between a change in movement speed of an occupant ΔVn and the amount of movement by the occupant ΔSn exceeds the collision determining threshold value Goff, a P/T signal having a true value of "1" is output to the P/T AND circuit 26 and a first A/B signal having a true value of "1" is output to the first A/B AND circuit 28 and the second A/B delay control section 30. In addition, after a predetermined delay time has passed since the first stage operation of the airbag apparatus, a second A/B signal having a true value of "1" is output to the second A/B delay control section 30.

Figure 15:
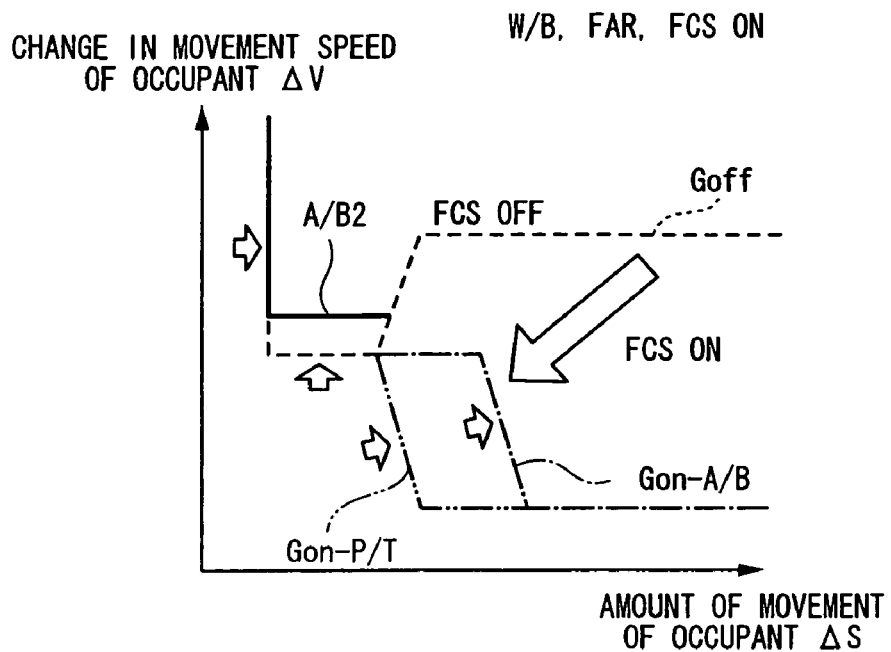

Moreover, in contrast to when the seatbelt is in a non-engaged state (N/B), and the seat position is at the rear (Far), and a collision of a predetermined size is measured by the front crash sensor 11 (FCS ON as shown in FIG. 11, when it is detected that the seatbelt is in an engaged state (W/B), then, for example, as shown in FIG. 15, a collision determining threshold value Gon-A/B (for example, indicated by the single dot chain line Gon-A/B shown in FIG. 15), and a collision determining threshold value Gon-P/T (for example, indicated by the double dot chain line Gon-P/T shown in FIG. 15), and the collision determining threshold value A/B2 are set to values that specify that operations of the airbag apparatus and seatbelt pretensioner are to be allowed in an area where at least the change in movement speed of an occupant ΔV or the amount of movement by the occupant ΔS is a higher value, namely, are set to values that make it more difficult to allow the airbag apparatus and seatbelt pretensioner to be operated.

Figure 16:
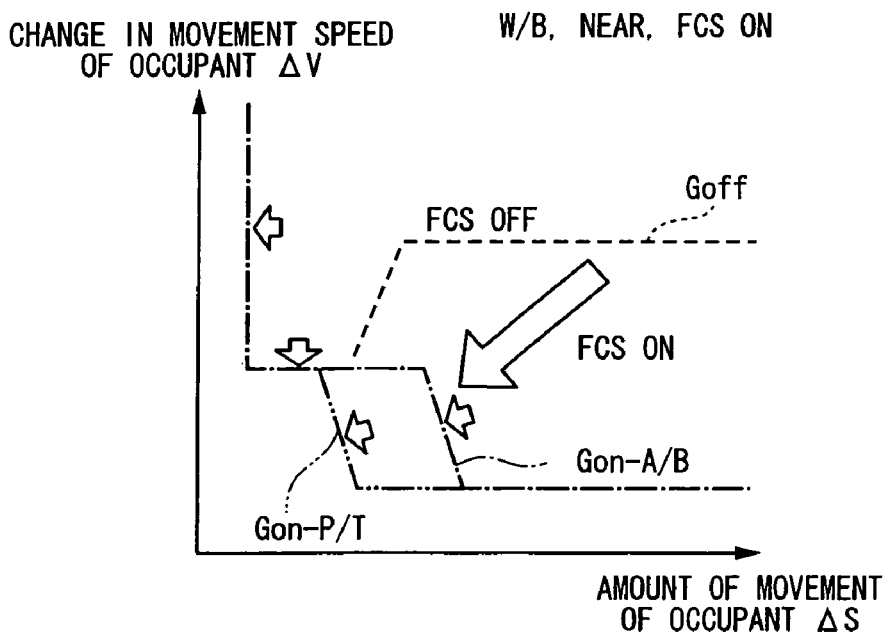

Moreover, in contrast to when the seatbelt is in an engaged state (W/B), and the seat position is at the rear (Far), and a collision of a predetermined size is measured by the front crash sensor 11 (FCS ON as shown in FIG. 15, when it is detected that the seat position is forward (Near), then, for example, as shown in FIG. 16, the collision determining threshold value Gon-A/B and the collision determining threshold value Gon-P/T are set to values that specify that operations of the airbag apparatus and seatbelt pretensioner are to be allowed in an area where at least the change in movement speed of an occupant ΔV or the amount of movement by the occupant ΔS is a lower value, namely, are set to values that make it easier to allow the operations of the airbag apparatus and seatbelt pretensioner.

In this case, when, for example, the collision determining threshold value A/B2 shown in FIG. 15 is omitted and it is determined that the correlation between a change in movement speed of an occupant ΔVn and the amount of movement by the occupant ΔSn exceeds the collision determining threshold value Gon-A/B, a first A/B signal having a true value of "1" is output to the first A/B AND circuit 28 and the second A/B delay control section 30. In addition, after a predetermined delay time has passed since the first stage operation of the airbag apparatus, a second A/B signal having a true value of "1" is output to the second A/B delay control section 30.

The collision determining apparatus for a vehicle 10 according to the present embodiment has the above described structure. Next, a description will be given of the operation of the collision determining apparatus for a vehicle 10, and, in particular, of processing to set the respective collision determining threshold values on an S-V map that shows a correlation between a change in movement speed of the occupant ΔV and an amount of movement of an occupant ΔS.

Figure 17:
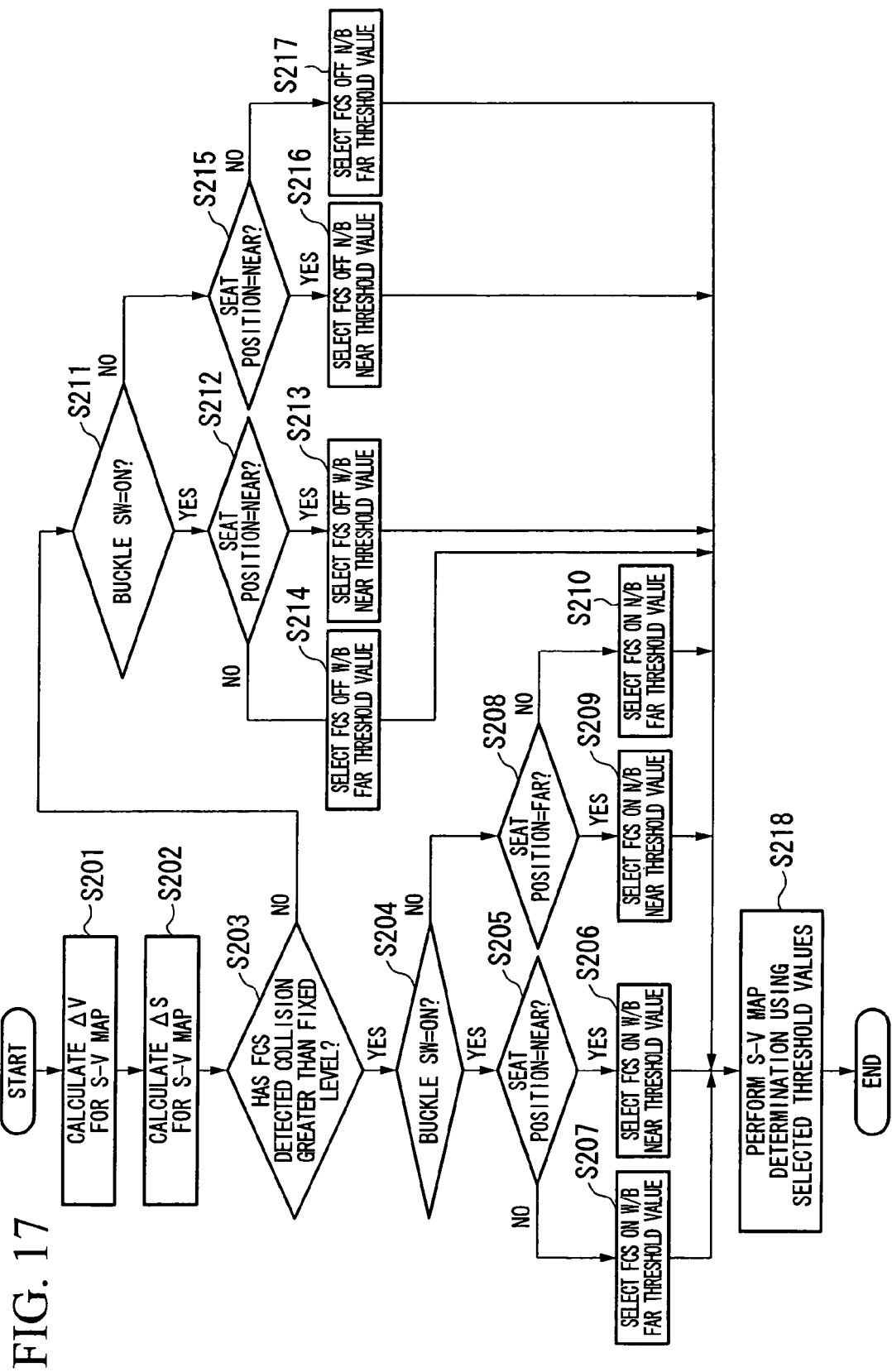
FIG. 17 is a flowchart showing an operation of a collision determining apparatus for a vehicle.

Firstly, in step S201 shown in FIG. 17, primary integration for time is performed on the acceleration signals G, as shown in Formula (1) above, and a change in movement speed of an occupant ΔVn in a time interval having a predetermined time width n relative to the current time tp (i.e., tp−n≦t≦tp) is calculated.

Next, in step S202, secondary integration for time is performed on the acceleration signals G, as shown in Formula (2) above, and an amount of movement of an occupant ΔSn in a time interval having a predetermined time width n relative to the current time tp (i.e., tp−n≦t≦tp) is calculated.

Next, in step S203, a determination is made as to whether or not a collision is detected in which an integral value ΔVFCS that is obtained by performing the primary integration for time on the acceleration signals output from the front crash sensor 11 is equal to or greater than a predetermined threshold value #ΔVFCS.

When the result of the determination is NO, for example, when a collision such as a low speed collision FL is detected, the routine moves to step S211 (described below).

When, however, the result of the determination is YES, for example, when a collision such as a frontal high speed collision FH or a high speed offset collision OF is detected, the routine moves to step S204.

In step S204, a determination is made as to whether or not the seatbelt is in an engaged state.

When the result of the determination is NO, the routine moves to step S208 (described below).

When, however, the result of the determination is YES, the routine moves to step S205.

In step S205, a determination is made as to whether the seat is in a forward position.

When the result of the determination in step S205 is YES, the routine moves to step S206, and the collision determining threshold value Gon-A/B and the collision determining threshold value Gon-P/T when the seatbelt is in an engaged state, and the seat position is at the front, and a collision of a predetermined size is measured by the front crash sensor 11, as shown in FIG. 16, are selected as collision determining threshold values on an S-V map (i.e., S-V Map threshold values), and the routine moves to step S218 (described below).

When, however, the result of the determination in step S205 is NO, the routine moves to step S207, and the collision determining threshold value Gon-A/B and the collision determining threshold value Gon-P/T when the seatbelt is in an engaged state, and the seat position is at the rear, and a collision of a predetermined size is measured by the front crash sensor 11, as shown in FIG. 15, are selected as collision determining threshold values on an S-V map (i.e., S-V Map threshold values), and the routine moves to step S218 (described below).

In step S208, a determination is made as to whether or not the seat is in a forward position.

When the result of the determination is YES, the routine moves to step S209, and the collision determining threshold value Gon-A/B and the collision determining threshold value Gon-P/T when the seatbelt is in a non-engaged state, and the seat position is at the front, and a collision of a predetermined size is measured by the front crash sensor 11, as shown in FIG. 12, are selected as collision determining threshold values on an S-V map (i.e., S-V Map threshold values), and the routine moves to step S218 (described below).

When, however, the result of the determination is NO, the routine moves to step S210, and the collision determining threshold value Gon-A/B and the collision determining threshold value Gon-P/T and the collision determining threshold value A/B2 when the seatbelt is in a non-engaged state, and the seat position is at the front, and a collision of a predetermined size is measured by the front crash sensor 11, as shown in FIG. 11, are selected as collision determining threshold values on an S-V map (i.e., S-V Map threshold values), and the routine moves to step S218 (described below).

In step S211, a determination is made as to whether or not the seatbelt is in an engaged state.

When the result of the determination is NO, the routine moves to step S215 (described below).

When, however, the result of the determination is YES, the routine moves to step S212.

In step S212, a determination is made as to whether the seat is in a forward position.

When the result of the determination in step S212 is YES, the routine moves to step S213, and the collision determining threshold value Goff when the seatbelt is in an engaged state, and the seat position is at the front, and a collision of a predetermined size is not measured by the front crash sensor 11, as shown in FIG. 14, are selected as collision determining threshold values on an S-V map (i.e., S-V Map threshold values), and the routine moves to step S218 (described below).

When, however, the result of the determination in step S212 is NO, the routine moves to step S214, and the collision determining threshold value Goff and the collision determining threshold value Gon-A/B when the seatbelt is in an engaged state, and the seat position is at the rear, and a collision of a predetermined size is not measured by the front crash sensor 11, as shown in FIG. 13, are selected as collision determining threshold values on an S-V map (i.e., S-V Map threshold values), and the routine moves to step S218 (described below).

In step S215, a determination is made as to whether or not the seat is in a forward position.

When the result of the determination is YES, the routine moves to step S216, and the collision determining threshold value Goff when the seatbelt is in a non-engaged state, and the seat position is at the front, and a collision of a predetermined size is not measured by the front crash sensor 11, as shown in FIG. 10, are selected as collision determining threshold values on an S-V map (i.e., S-V Map threshold values), and the routine moves to step S218 (described below).

When, however, the result of the determination is NO, the routine moves to step S217, and the collision determining threshold value Gon-A/B and the collision determining threshold value Goff when the seatbelt is in a non-engaged state, and the seat position is at the rear, and a collision of a predetermined size is not measured by the front crash sensor 11, as shown in FIG. 9, are selected as collision determining threshold values on an S-V map (i.e., S-V Map threshold values), and the routine moves to step S218 (described below).

In step S218, a determination is made as to whether a correlation on an S-V map between the change in movement speed of an occupant $\Delta Vn$ and the amount of movement of the occupant $\Delta Sn$ is equal to or more than the selected respective collision determining threshold values, and a command signal is output in accordance with the result of the determination. The processing sequence is then ended.

As described above, in accordance with the collision determining apparatus for a vehicle 10 according to the present embodiment, because collision determining threshold values are set for a correlation between an amount of movement of the occupant $\Delta S$ and a change in movement speed of an occupant $\Delta V$ in accordance with the state of engagement of the seatbelt of an occupant and a seat position, it is possible to determine the mode of movement of an occupant in more detail compared with when operations of occupant protection apparatuses are controlled based simply on the acceleration signal G, and it is possible to operate the occupant protection apparatuses at a more appropriate timing.

The fourth embodiment of the collision determining apparatus for a vehicle of the present invention will now be described with reference made to FIGS. 18 through 22. Note that component elements that are the same as those already described in the above first, second, and third embodiments are given the same symbols and a description thereof is omitted.

The collision determining apparatus for a vehicle 10 of the present embodiment is provided with a plurality of satellite sensors and an electronic control unit (ECU) 20 that is located in the center of the vehicle (see FIG. 1).

Figure 18:
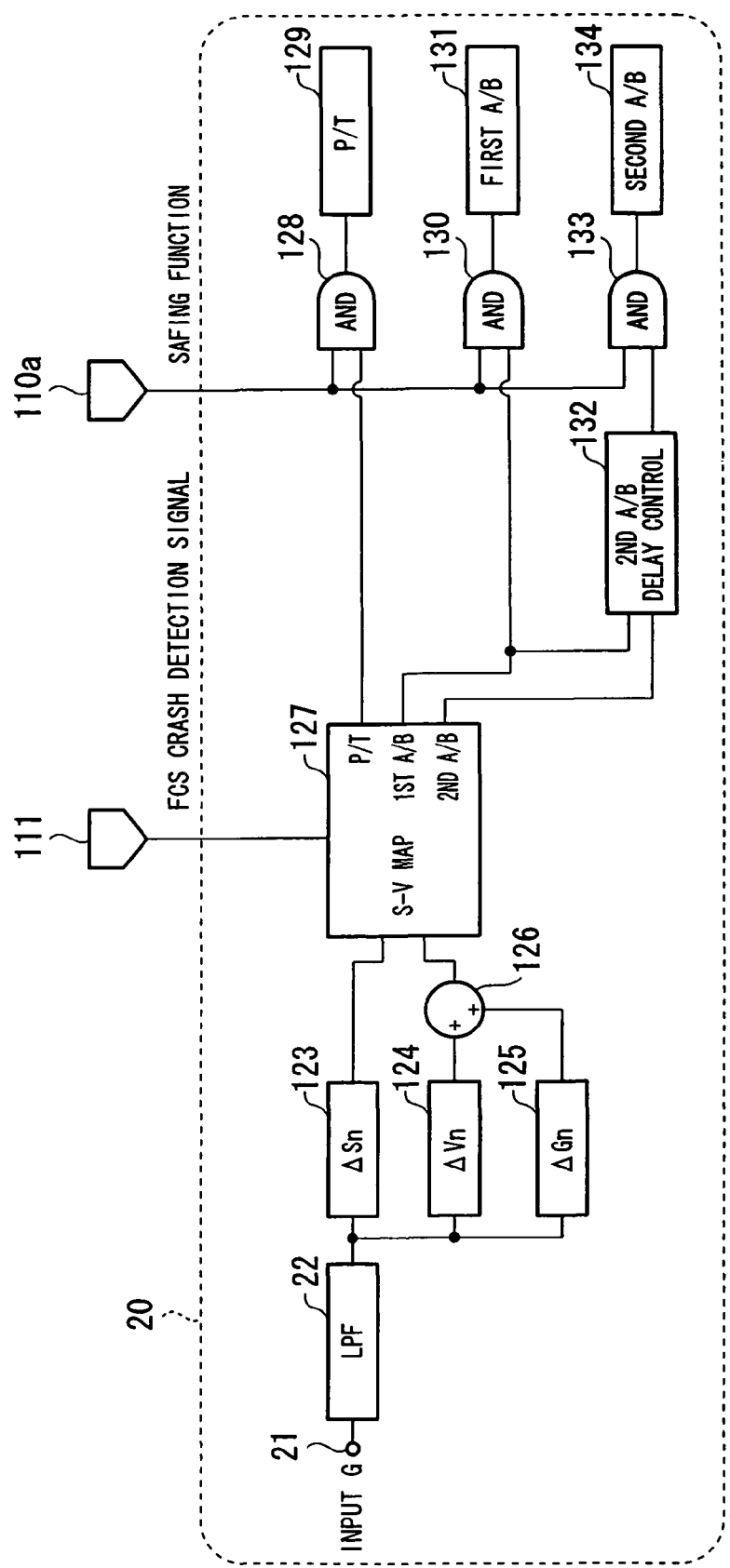
FIG. 18 is a view showing a fourth embodiment of the collision determining apparatus for a vehicle of the present invention and is a block diagram of the collision determining apparatus for a vehicle.

As shown in FIG. 18, the electronic control unit 20 is provided, for example, with an acceleration sensor 21, a filter processing section 22, a $\Delta Sn$ calculation section (change in movement speed calculating device) 123, a $\Delta Vn$ calculation section (movement amount calculating device) 124, a $\Delta Gn$ calculation section (change in acceleration calculating device) 125, a $\Delta Vn \Delta Gn$ calculation section (change quantity of state calculating device) 126, an SVG determination processing section (third collision determining threshold value setting device) 127, a P/T AND circuit 128, a P/T startup signal generating section (fourth control signal generating device) 129, a first A/B AND circuit 130, a first A/B startup signal generating section (fourth control signal generating device) 131, a second A/B delay control section 132, a second A/B AND circuit 133, and a second A/B startup signal generating section (fourth control signal generating device) 134.

The $\Delta Sn$ calculation section 123 performs a secondary integration for time on the acceleration signals G that are output from the filter processing section 22, and, as shown below in Formula (4), for example, calculates an amount of movement of an occupant $\Delta Sn$ in a time interval having a predetermined time width n relative to the current time tp (i.e., $tp-n \leq t \leq tp$), and outputs the result to the SVG determination processing section 127.

The $\Delta Vn$ calculation section 124 performs a primary integration for time on the acceleration signals G that are output from the filter processing section 22, and, as shown below in Formula (5), for example, calculates a change in movement speed of an occupant $\Delta Vn$ in the time interval having a predetermined time width n relative to the current time tp (i.e., $tp-n \leq t \leq tp$), and outputs the result to the $\Delta Vn \Delta Gn$ calculation section 126 and the SVG determination processing section 127.

The $\Delta Gn$ calculation section 125 performs a primary integration for time on the acceleration signals G that are output from the filter processing section 22, and, as shown below in Formula (6), for example, calculates a difference between respective integral values (i.e., a change in the acceleration) $\Delta Gn$ in time intervals having different predetermined time widths n relative to the current time tp (i.e., $tp-2n \leq t \leq tp-n$ and $tp-n \leq t \leq tp$), namely, calculates a temporal change in the integral values, and outputs the result to the $\Delta Vn \Delta Gn$ calculation section 126.

$$\Delta Sn = \int \int_{tp-n}^{tp} G(t) dt \quad (1)$$

$$\Delta Vn = \int_{tp-n}^{tp} G(t) dt \quad (2)$$

$$\Delta Gn = \int_{tp-n}^{tp} G(t) dt - \int_{tp-2n}^{tp-n} G(t) dt \quad (3)$$

The ΔVnΔGn calculation section 126 calculates a quantity of state of change ΔVnΔGn by adding together the change in movement speed of an occupant ΔVn that is output from the ΔVn calculation section 124 and the change in the acceleration ΔGn that is output from the ΔGn calculation section 125, and outputs the result to the SVG determination processing section 127.

Figure 19A:
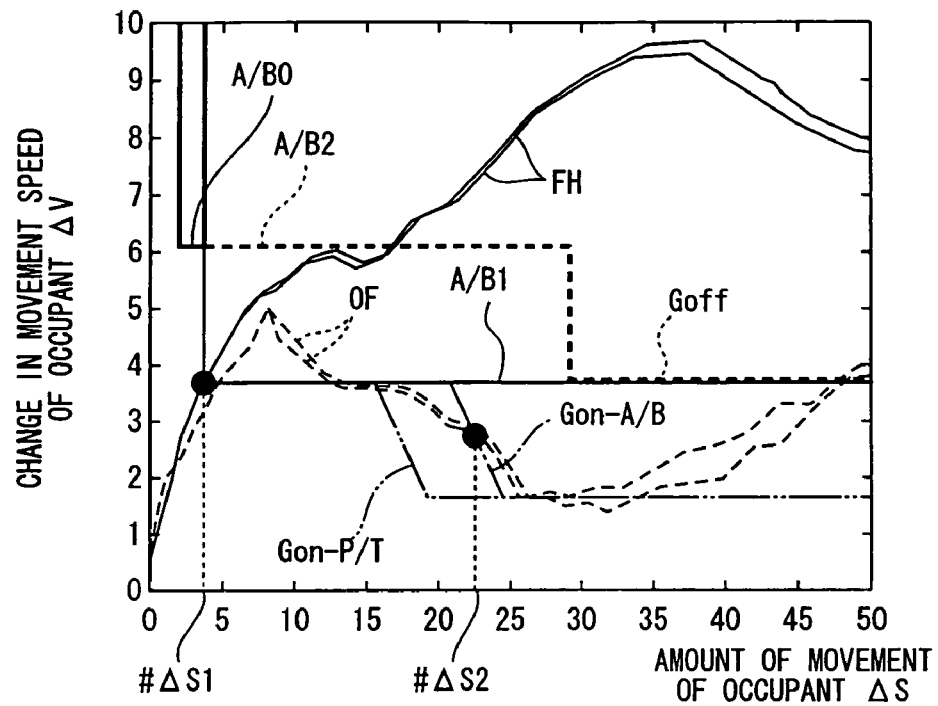
FIG. 19A is a view showing an example of a collision determination threshold value on an S-V map.
Figure 19B:
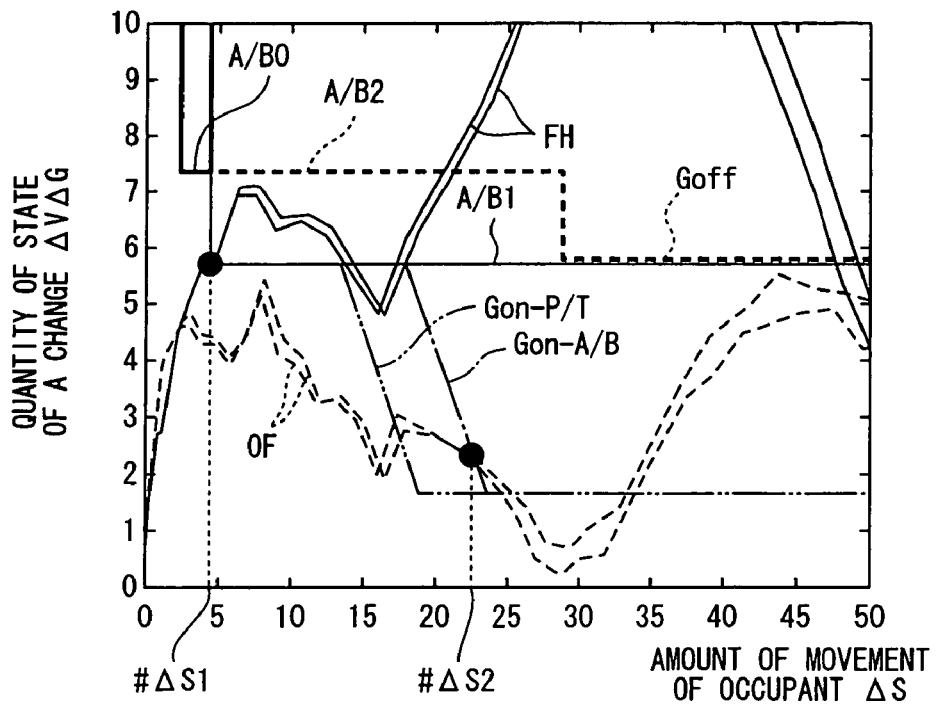
FIG. 19B is a view showing an example of a collision determination threshold value on an S-VG map.
Figure 20A:
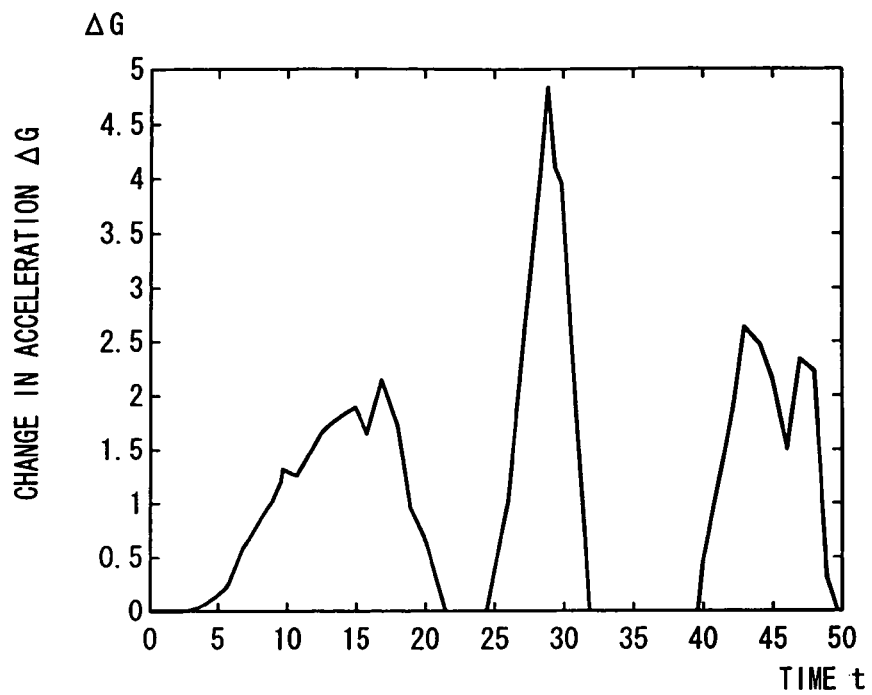
Figure 20B:
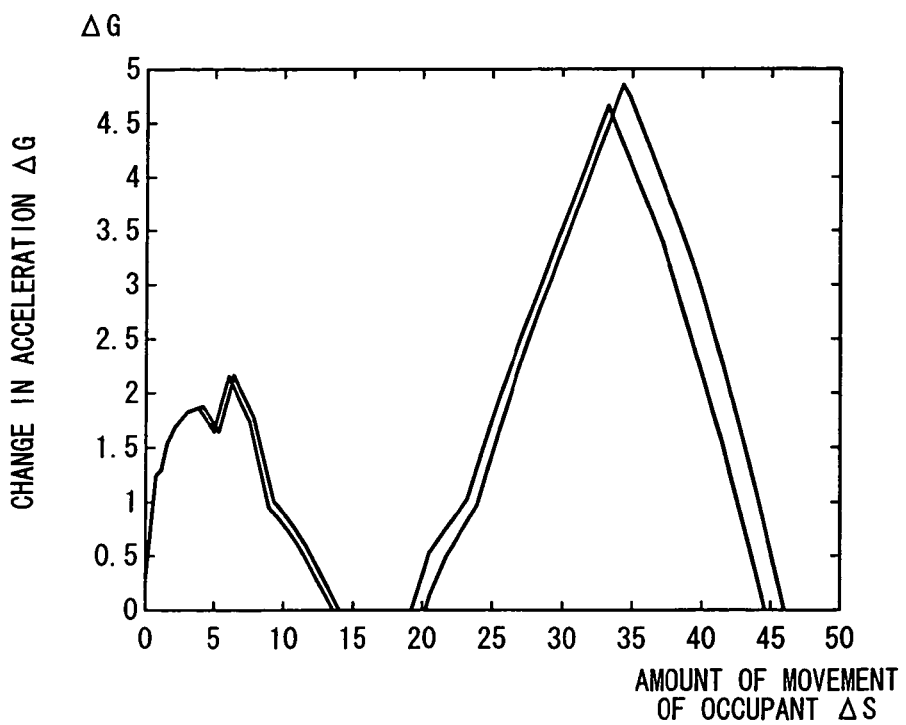
FIG. 20B is a view showing an example of changes in a change in the acceleration ΔG in response to a frontal collision in accordance with an amount of movement of an occupant ΔS.
Figure 21A:
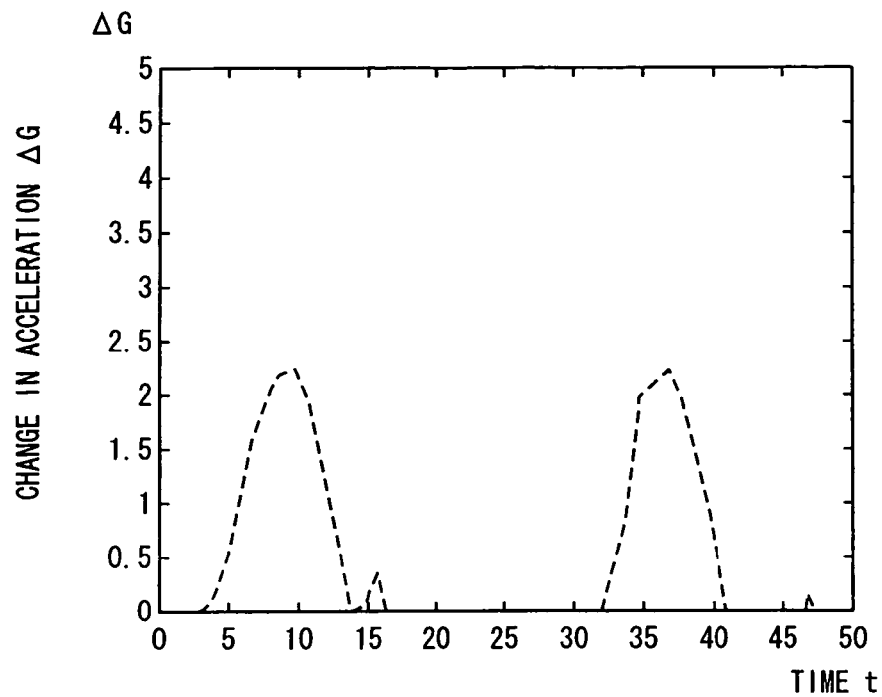
Figure 21B:
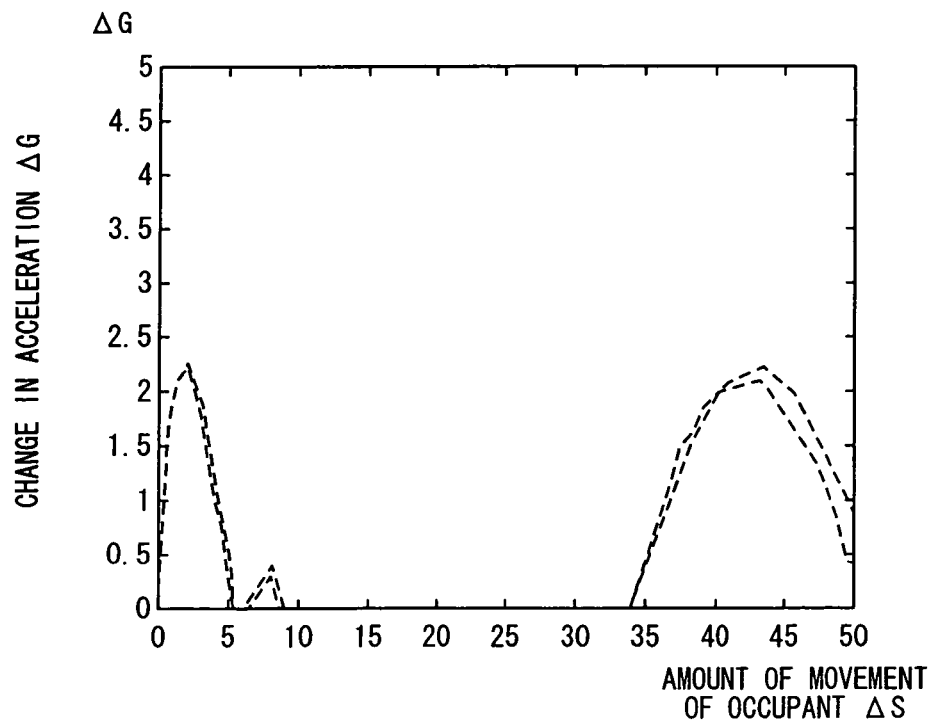
FIG. 21B is a view showing an example of changes in a change in the acceleration ΔG in response to an oblique collision in accordance with an amount of movement of an occupant ΔS.

Here, in contrast to the S-V map that shows a correlation between the change in movement speed of an occupant ΔV and the amount of movement of an occupant ΔS which is shown in FIG. 19A, the map S-VG that shows a correlation between a quantity of state of change ΔVΔG and the amount of movement of an occupant ΔS, for example, which is shown in FIG. 19B corresponds to a map that might be obtained by, for example, adding an S-G map that shows a correlation between a change in the acceleration ΔG and an amount of movement of an occupant ΔS which is shown in FIGS. 20B and 21B to the S-V map shown in FIG. 19A. The S-G map that is shown in FIGS. 20B and 21B is obtained by converting a time t into an amount of movement of an occupant ΔS on the map of temporal changes in the change in the acceleration ΔG which is shown, for example, in FIGS. 20A and 21A.

The SVG determination processing section 127 sets, for a plurality of different occupant protection apparatuses such as, for example, airbags and seatbelt pretensioners, collision determination threshold values, which are boundary values of respective areas that specify whether each operation is possible or not possible for a plurality of operating states of a vehicle protection apparatus, on an S-VG map that shows a correlation between a quantity of state of change ΔVΔG, which is obtained by adding together a change in movement speed of an occupant ΔV and a change in the acceleration ΔG and an amount of movement of an occupant ΔS (for example, rectangular coordinates that take the amount of movement by the occupant ΔS as the horizontal axis and the quantity of state of change ΔVΔG as the vertical axis) while referring to determinations results that show whether or not a collision of a predetermined size is measured by the satellite sensors (for example, by the front crash sensors (L-FCS or R-FCS) 11). In addition, the SVG determination processing section 127 determines for each occupant protection apparatus whether or not the correlation between the amount of movement of the occupant ΔSn that is input from the ΔSn calculation section 123 and the quantity of state of change ΔVnΔGn that is input from the ΔVnΔGn calculation section 126 exceeds a predetermined collision determination threshold value. For example, when it is determined that the correlation exceeds the collision determination threshold value for a seatbelt pretensioner, a P/T signal having a true value of "1" is output to the P/T AND circuit 128. Moreover, when it is determined that the correlation exceeds the respective collision determination threshold values corresponding to each stage of an operation in multiple stages (for example, an operation in two stages) or to an operation in one stage of, for example, an airbag apparatus, then a first A/B signal having a true value of "1" corresponding to the first stage of the operation is output to the first A/B AND circuit 130 and to the second A/B delay control section 132, and a second A/B signal having a true value of "1" corresponding to the second stage of the operation is output to the second A/B delay control circuit 132.

Note that a multiple stage operation of the airbag apparatus is an operation that is based on multiple stage ignition commands. Namely, when the airbag is expanded by generating a gas using an inflator, the gas is not generated one time only at maximum output, but instead the gas is generated, for example, by igniting a plurality of gas generating agents in successive stages. In addition, a one stage operation of an airbag apparatus is an operation in which, for example, gas is generated by igniting a plurality of gas generating agents at the same timing.

For example, on the S-VG map shown in FIG. 19, when a collision of a predetermined size is not measured by the front crash sensor 11, a collision determining threshold value Goff (for example, indicated by the dotted line Goff shown in FIG. 19B) that specifies whether a slow, multiple stage operation (for example, a slow operation in two stages) of an airbag apparatus and an operation of a seatbelt pretensioner are to be allowed or not allowed is set to a value that specifies that operations of the airbag apparatus and the seatbelt pretensioner are to be allowed in an area where at least the change in movement speed of an occupant ΔV or the quantity of state of change ΔVΔG is a relatively high value, for example, to a value that is high enough to allow low speed collisions in which the operation of the occupant protection apparatuses is not required to be excluded.

In an area where the amount of movement of the occupant ΔS is relatively small and the quantity of state of change ΔVΔG is relatively large, then, irrespective of the results of the measurement by the front crash sensor 11, respective collision determining threshold values, for example, two collision determining threshold values A/B1 and A/B2 (for example, indicated by the solid line A/B1 and the bold dotted line A/B2 shown in FIG. 19) corresponding to each stage that specify whether a rapid operation in multiple stages (for example, a rapid operation in two stages) of the airbag apparatus is to be allowed or not allowed are set. The collision determining threshold value A/B1 that specifies whether a first stage operation of the airbag apparatus is to be allowed or not allowed is set, for example, to a value that is high enough to allow low speed collisions, in which the operation of the occupant protection apparatuses is not required, to be excluded. In addition, the collision determining threshold value A/B2 that specifies whether a second stage operation of the airbag apparatus is to be allowed or not allowed is set to a value that specifies that the second stage operation of the airbag apparatus is to be allowed in an area where the quantity of state of change ΔVΔG is a higher value than it is for the collision determining threshold value A/B1.

Furthermore, in an area where the amount of movement of the occupant ΔS is relatively small in comparison with an area where it is specified that a rapid operation in multiple stages (for example, a rapid operation in two stages) of the airbag apparatus is allowed, then, irrespective of the results of the measurement by the front crash sensor 11, a collision determining threshold value A/B0 (for example, indicated by the bold solid line A/B0 shown in FIG. 19B) that specifies whether a rapid one stage operation of the airbag apparatus is to be allowed or not allowed is set.

Moreover, in areas other than areas where it is specified that a rapid operation of the airbag apparatus is to be allowed, when a collision of a predetermined size is measured by the front crash sensor 11, a collision determining threshold value Gon-A/B that specifies whether a slow multiple stage operation of an airbag apparatus is to be allowed or not allowed (for example, indicated by the single dot chain line Gon-A/B shown in FIG. 19B) and a collision determining threshold value Gon-P/T that specifies whether an operation of the seatbelt pretensioner is to be allowed or not allowed (for example, indicated by the double dot chain line Gon-P/T shown in FIG. 19B) are set to values that specify that operations of the airbag apparatus and the seatbelt pretensioner are to be allowed in an area where at least the change in movement speed of an occupant $\Delta V$ or the amount of movement of the occupant $\Delta S$ becomes a lower value than for the collision determining threshold value Goff (for example, indicated by the dotted line Goff shown in FIG. 19B), namely, to values that make it easier to allow operations of the airbag apparatus and the seatbelt pretensioner. Furthermore, the collision determining threshold value Gon-P/T (for example, indicated by the double dot chain line Gon-P/T shown in FIG. 19B) is set to a value that specifies that an operation of the seatbelt pretensioner is to be allowed in an area where at least the quantity of state of change $\Delta V \Delta G$ or the amount of movement of the occupant $\Delta S$ is a lower value than for the collision determining threshold value Gon-A/B (for example, indicated by the single dot chain line Gon-A/B shown in FIG. 19B), namely, to a value that makes an operation of the seatbelt pretensioner easier to allow than an operation of the airbag apparatus.

Note that when respective collision determining threshold values A/B1 and A/B2 that correspond to each stage of a multiple stage rapid operation are set for a multiple stage rapid operation of the airbag apparatus, and when it is determined that a correlation between quantity of state of change $\Delta V \Delta G$ and the amount of movement of the occupant $\Delta Sn$ exceeds the collision determining threshold value A/B1, then a first A/B signal having a true value of "1" is output to the first A/B AND circuit 130 and the second A/B delay control section 132. When it is determined that this correlation exceeds the collision determining threshold A/B2, then a second A/B signal having a true value of "1" is output to the second A/B delay control section 132.

When, however, only a single collision determining threshold value Gon-A/B is set for a slow multiple stage operation of the airbag apparatus, and it is determined that a correlation between the quantity of state of change $\Delta V \Delta G$ and the amount of movement of the occupant $\Delta Sn$ exceeds the collision determining threshold value Gon-A/B, then, in accordance with the first stage operation, a first A/B signal having a true value of "1" is output to the first A/B AND circuit 130 and the second A/B delay control section 132.

The P/T AND circuit 128 outputs as a P/T signal to the P/T startup signal generating section 129 a signal that is obtained from the logical product of a P/T signal output from the SVG determination processing section 127 and a safing signal that is output from a mechanical or electronic type of safing sensor 10a that outputs safing signals having a true value of "1" when, for example, it measures acceleration (or deceleration) of a predetermined value or greater.

The P/T startup signal generating section 129 outputs, in accordance with a P/T signal that is output from the P/T AND circuit 128, a command signal that causes a seatbelt pretensioner to be operated.

The first A/B AND circuit 130 outputs as a first A/B signal to the first A/B startup signal generating section 131 a signal that is obtained from the logical product of a first A/B signal output from the SVG determination processing section 127 and a safing signal that is output from the mechanical or electronic type of safing sensor 10a that outputs safing signals having a true value of "1" when, for example, it measures acceleration (or deceleration) of a predetermined value or greater.

The first A/B startup signal generating section 131 outputs, in accordance with a first A/B signal that is output from the first A/B AND circuit 130, a command signal that causes an airbag apparatus to be operated at a first stage.

The second A/B delay control section 132 controls the timing at which the operation of the airbag apparatus is executed at the second stage after the operation at the first stage, namely, controls the timing at which the second A/B signals are output based on the first A/B signals or the first A/B signals and second A/B signals that are output from the SVG determination processing section 127.

The second A/B AND circuit 133 outputs as a second A/B signal to the second A/B startup signal generating section 134 a signal that is obtained from the logical product of a second A/B signal output from the second A/B delay control section 132 and a safing signal that is output from the mechanical or electronic type of safing sensor 10a that outputs safing signals having a true value of "1" when, for example, it measures an acceleration (or deceleration) of a predetermined value or greater.

The second A/B startup signal generating section 134 outputs, in accordance with a second A/B signal that is output from the second A/B AND circuit 133, a command signal that causes an airbag apparatus to be operated at a second stage.

The collision determining apparatus for a vehicle 10 according to the present embodiment has the above described structure. Next, a description will be given of the operation of the collision determining apparatus for a vehicle 10, and, in particular, of processing to operate the airbag apparatus rapidly in one stage or rapidly or slowly in multiple stages.

Figure 22:
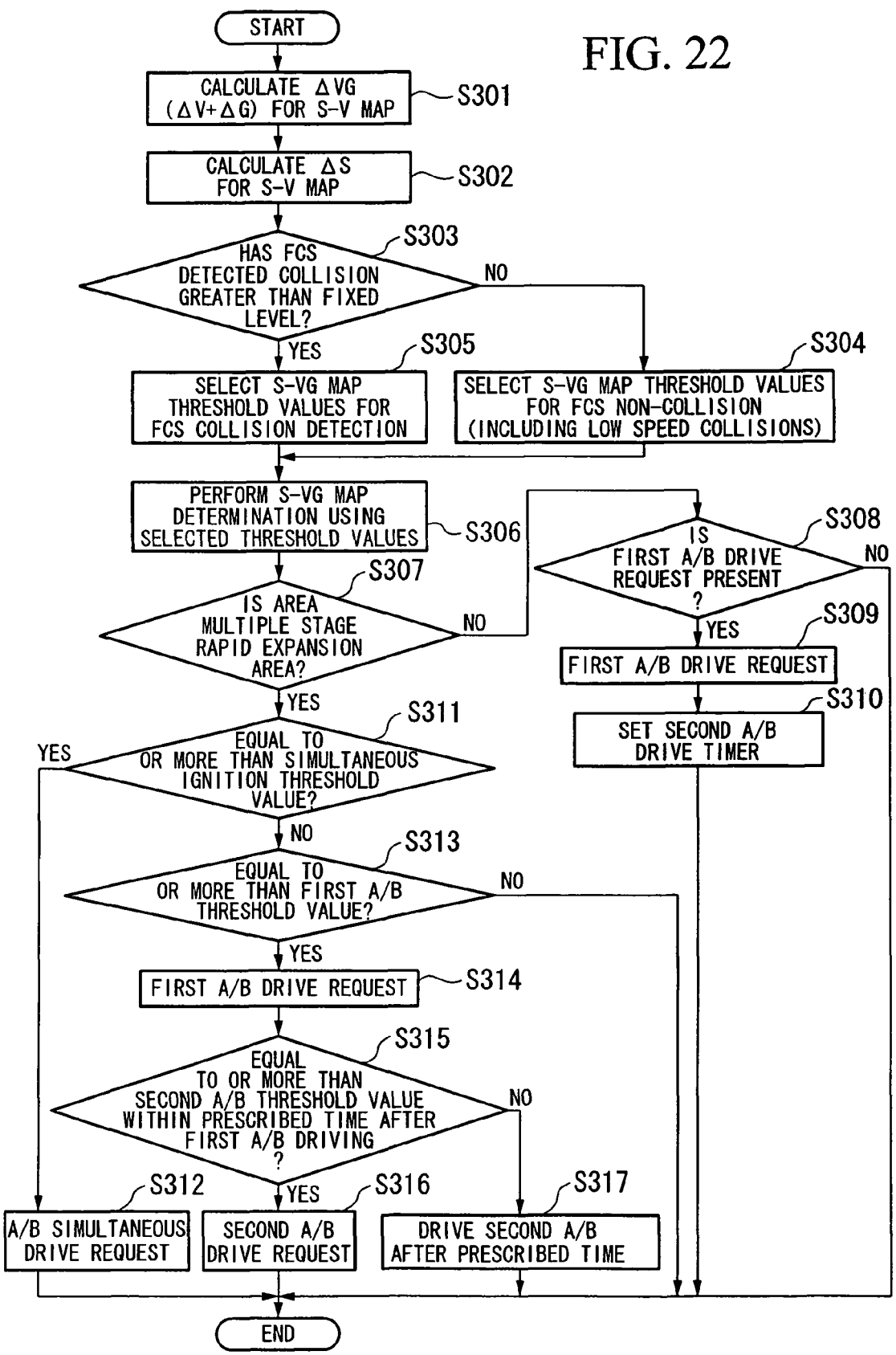
FIG. 22 is a flowchart showing a process to operate an airbag rapidly apparatus in multiple stages or to operate an airbag apparatus slowly in multiple stages.

Firstly, in step S301 shown in FIG. 22, primary integration for time is performed on the acceleration signals G, as shown in Formula (5) above, and a change in movement speed of an occupant $\Delta Vn$ in a time interval having a predetermined time width n relative to the current time tp (i.e., tp$-$n$\leqq$t$\leqq$tp) is calculated. Furthermore, as shown in Formula (6) above, primary integration for time is performed on the acceleration signals G, and a difference between respective integral values (i.e., a change in the acceleration) $\Delta Gn$ in time intervals having different predetermined time widths n relative to the current time tp (i.e., tp$-$2n$\leqq$t$\leqq$tp$-$n and tp$-$n$\leqq$t$\leqq$tp) is calculated, namely, a temporal change in the integral values is calculated. The quantity of state of change $\Delta Vn\Delta Gn$ is then calculated by adding together the change in movement speed of an occupant $\Delta Vn$ and the change in the acceleration $\Delta Gn$.

Next, in step S302, secondary integration for time is performed on the acceleration signals G, as shown in Formula (4) above, and an amount of movement of an occupant $\Delta Sn$ in a time interval having a predetermined time width n relative to the current time tp (i.e., tp$-$n$\leqq$t$\leqq$tp) is calculated.

Next, in step S303, a determination is made as to whether or not a collision is detected in which an integral value $\Delta VFCS$ obtained by performing the primary integration for time on the acceleration signals output from the front crash sensor 11 is equal to or greater than a predetermined threshold value #$\Delta VFCS$.

When the result of the determination is YES, for example, when a collision such as a frontal high speed collision FH or a high speed offset collision OF is detected, the routine moves to step S305 (described below).

When, however, the result of the determination is NO, for example, when a collision such as a low speed collision FL is detected, the routine moves to step S304.

In step S304, the collision determining threshold value Goff (for example, indicated by the dotted line Goff shown in FIG. 19B) that specifies whether an operation of the airbag apparatus and the seatbelt pretensioner is to be allowed or not allowed when a collision of a predetermined size is not measured by the front crash sensor 11, and the respective collision determining threshold values A/B1 and A/B2 (for example, indicated by the solid line A/B1 and the bold solid line A/B2 shown in FIG. 19B) that, in accordance with each stage, specify whether a rapid operation in multiple stages (for example, a rapid operation in two stages) of the airbag apparatus is to be allowed or not allowed irrespective of the result of the measurement by the front crash sensor 11 are selected as collision determining threshold values on an S-VG map (i.e., S-VG Map threshold values), and the routine moves to step S306 (described below).

Moreover, in step S305, the collision determining threshold value Gon-A/B (for example, indicated by the single dot chain line Gon-A/B shown in FIG. 19B) that specifies whether a slow operation of the airbag apparatus in multiple stages is to be allowed or not allowed when a collision of a predetermined size is not measured by the front crash sensor 11, and the collision determining threshold value Gon-P/T (for example, indicated by the double dot chain line Gon-P/T shown in FIG. 19B) that specifies whether an operation of the seatbelt pretensioner is to be allowed or not allowed when a collision of a predetermined size is measured by the front crash sensor 11, as well as the respective collision determining threshold values A/B1 and A/B2 (for example, indicated by the solid line A/B1 and the bold solid line A/B2 shown in FIG. 19B) that, in accordance with each stage, specify whether a rapid operation in multiple stages (for example, a rapid operation in two stages) of the airbag apparatus is to be allowed or not allowed irrespective of the result of the measurement by the front crash sensor 11 are selected as collision determining threshold values on an S-VG map (i.e., S-VG Map threshold values), and the routine moves to step S306 (described below).

In addition, in step S306, a determination is made as to whether or not the correlation on the S-VG map between the quantity of state of change $\Delta Vn\Delta Gn$ input from the $\Delta Vn\Delta Gn$ calculation section 126 and the amount of movement of the occupant $\Delta Sn$ input from the $\Delta Sn$ calculation section 123 exceeds the respective collision determining threshold values that is selected.

In step S307, in accordance with the result of the determination in step S306, a determination is made as to whether or not the correlation between the quantity of state of change $\Delta Vn\Delta Gn$ and the amount of movement of the occupant $\Delta Sn$ is in an area where a rapid operation in multiple stages of the airbag apparatus (i.e., a multiple stage rapid expansion) is specified.

When the result of the determination is YES, the routine moves to step S311 (described below).

When, however, the result of the determination is NO, the routine moves to step S308.

In step S308, a determination is made as to whether or not a drive request (i.e., First A/B drive request) for the first stage operation of the slow, multiple stage operation of the airbag apparatus is generated as a result of the correlation on the S-VG map between the quantity of state of change $\Delta Vn\Delta Gn$ and the amount of movement of the occupant $\Delta Sn$ exceeding the collision determining threshold Gon-A/B.

When the result of the determination is NO, the processing sequence is ended.

When, however, the result of the determination is YES, the routine moves to step S309, and a command signal (i.e., the First A/B drive request) is output in order to operate the airbag apparatus at the first stage.

Next, in step S310, an operation of a drive timer is started. This drive timer sets the timing at which command signals are output in order to operate the airbag apparatus at the second stage after a predetermined delay time has lapsed since the operation of the airbag apparatus at the first stage. At the point in time when the measurement of a predetermined delay time by the drive timer has ended, a command signal (i.e., Second A/B drive signal) is output in order to operate the airbag apparatus at the second stage. The processing sequence is then ended.

In step S311, a determination is made as to whether or not the correlation on the S-VG map between the quantity of state of change $\Delta Vn\Delta Gn$ and the amount of movement of the occupant $\Delta Sn$ is equal to or greater than the collision determining threshold value A/B0 that corresponds to a rapid operation in a single stage of the airbag apparatus.

When the result of the determination is NO, the processing sequence moves to step S313 (described below).

When, however, the result of the determination is YES, the routine moves to step S312.

In step S312, a command signal is output in order to perform a rapid operation of the airbag apparatus in one stage, for example, a command signal instructing that the respective operations of the first stage and second stage of the airbag apparatus be executed simultaneously is output, and the processing sequence is ended.

In step S313, a determination is made as to whether or not the correlation on the S-VG map between the quantity of state of change $\Delta Vn\Delta Gn$ and the amount of movement of the occupant $\Delta Sn$ is equal to or greater than the collision determining threshold value A/B1 that corresponds to the operation of the first stage of a rapid operation in multiple stages of the airbag apparatus.

When the result of the determination is NO, the processing sequence is ended.

When, however, the result of the determination is YES, the routine moves to step S314 and a command signal is output in order to operate the airbag apparatus at the first stage.

Next, in step S315, a determination is made within a prescribed time (for example, 5 ms) after the first stage operation of the airbag apparatus as to whether or not the correlation on the S-VG map between the quantity of state of change $\Delta Vn\Delta Gn$ and the amount of movement of the occupant $\Delta Sn$ is equal to or greater than the collision determining threshold value A/B2 that corresponds to the operation at the second stage of the multiple stage rapid operation of the airbag apparatus.

When the result of the determination in step S315 is YES, the routine moves to step S316 and a command signal (i.e., Second A/B drive request) is output immediately in order to operate the airbag apparatus at the second stage. The processing sequence is then ended.

When, however, the result of the determination in step S315 is NO, the routine moves to step S317 and, after a prescribed time has lapsed since the operation of the airbag apparatus at the first stage, a command signal is output in order to operate the airbag apparatus at the second stage and the processing sequence is then ended.

For example, on an S-V map that shows a correlation between an amount of movement of the occupant $\Delta S$ and a change in movement speed of an occupant $\Delta V$, as shown in FIG. 19A, in an area where the amount of movement of the occupant $\Delta S$ is relatively small, namely, in the initial stages of a collision occurrence, there is a relatively small difference in the change in movement speed of the occupant ΔV between a relatively high speed frontal collision in which the rapid operation of an airbag apparatus is desired (for example, indicated by the fine solid line FH shown in FIG. 19A) and a relatively low speed frontal collision or a collision from an oblique direction in which the slow operation of an airbag apparatus is desired (for example, indicated by the fine broken line OF shown in FIG. 19A). Even if a different timing is desired for the operation of the airbag apparatus in each collision (for example, indicated by the # ΔS1 and #ΔS2 shown in FIG. 19A), there is a possibility that the airbag apparatus will be operated at substantially the same timing (for example, indicated by the #ΔS1 shown in FIG. 19A and FIG. 19B).

In contrast to this, as shown in FIG. 19B, for example, on an S-VG map that shows a correlation between an amount of movement of the occupant ΔS and a quantity of state of change ΔVΔG, even in an area where the amount of movement of the occupant ΔS is relatively small, namely, in the initial stages of a collision occurrence, because there is a comparatively large difference in the change in the acceleration ΔG which shows the occurrence type of the acceleration that acts on an occupant, there is a greater difference in the quantity of state of change ΔVΔG between a relatively high speed frontal collision in which the rapid operation of an airbag apparatus is desired (for example, indicated by the fine solid line FH shown in FIG. 19B) and a relatively low speed frontal collision or a collision from an oblique direction in which the slow operation of an airbag apparatus is desired (for example, indicated by the fine broken line OF shown in FIG. 19B). It is consequently possible to operate an airbag apparatus appropriately for each collision at the desired operation timing (for example, indicated by the #ΔS1 and #ΔS2 shown in FIG. 19A).

As described above, according to the collision determining apparatus for a vehicle 10 of the present embodiment, by determining whether or not a correlation between an amount of movement of the occupant ΔS and a quantity of state of change ΔVΔG that is obtained by adding together a change in movement speed of an occupant ΔV and the change in the acceleration of the occupant ΔG exceeds the respective collision determining threshold values, even in the initial stages of a collision occurrence in particular, it is possible, based on the occurrence type of the acceleration that acts on an occupant, to determine the state of the collision in detail and to more appropriately operate an occupant protection apparatus compared with when a simple determination is made as to whether or not a correlation between an amount of movement of the occupant ΔS and a change in movement speed of an occupant ΔV exceeds a collision determining threshold value.

Note that, in the above described embodiment, the collision determining threshold value A/B0 that specifies whether a rapid operation in a single stage of the airbag apparatus is to be allowed or not allowed, as well as the respective collision determining threshold values corresponding to each stage, for example, the two collision determining threshold values A/B1 and A/B2 that specify whether a rapid operation in multiple stages of an airbag apparatus is to be allowed or not allowed are immutable values that do not change irrespective of the results of measurement by the front crash sensor 11, however, the present invention is not limited to this, and it is also possible to alter the respective collision determining threshold values A/B0, A/B1, and A/B2 in accordance with whether or not a collision of a predetermined size is measured by the front crash sensor 11.

In this case, the respective collision determining threshold values A/B0, A/B1, and A/B2 when a collision of a predetermined size has is measured by the front crash sensor 11 are set to values that specify that the operation of the airbag apparatus is to be allowed, namely, are set to values that make it easier to allow the operation of the airbag apparatus in an area where at least the quantity of state of change ΔVΔG is a lower value compared to the respective collision determining threshold values A/B0, A/B1, and A/B2 when a collision of a predetermined size is not measured by the front crash sensor 11.

In the above described first, second, third, and fourth embodiments, an airbag apparatus and a seatbelt pretensioner are driven and controlled to serve as occupant protection apparatuses, however, the present invention is not limited to this and it is also possible to drive and control seat devices whose seat position and configuration and the like are capable of being altered.

Moreover, in each of the above described embodiments, a collision determining threshold value is set on an S-VG map for each one of a plurality of different occupant protection apparatuses, however, the present invention is not limited to this, and it is also possible to set the same collision determining threshold value for of a plurality of different occupant protection apparatuses.

While preferred embodiments of the invention as described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as limited by the foregoing description and is only limited by the scope of the appended claims.

What is claimed is:

1. A collision determining apparatus for a vehicle having an occupant protection apparatus, which comprises an airbag apparatus and a seatbelt pretensioner, the collision determining apparatus for a vehicle comprising:

a first acceleration measuring device which measures an acceleration acting on the vehicle;

a second acceleration measuring device which measures an acceleration acting on a position further to in an outer peripheral portion side of the vehicle than the first acceleration measuring device;

a movement amount calculating device which calculates an amount of movement of the occupant based on the acceleration which is measured by the first acceleration measuring device;

a change in movement speed calculating device which calculates a change in movement speed of the occupant based on the acceleration which is measured by the first acceleration measuring device;

a first collision determining threshold value setting device which sets first to fifth collision determining threshold values for a correlation between the amount of movement of the occupant and the change in movement speed of the occupant based on the acceleration which is measured by the second acceleration measuring device;

a first collision determining device which determines whether or not the correlation exceeds at least one of first to fifth collision determining threshold values; and a first control signal generating device which generates a control signal which instructs that the airbag apparatus be operated slowly in multiple stages or be operated rapidly in multiple stages and the seatbelt pretensioner be operated or not, in accordance with a result of a determination by the first collision determining device;

wherein the first collision determining threshold value is set such that a slow operation in multiple states of the airbag apparatus and an operation of the seatbelt pretensioner are simultaneously preformed when a collision of a predetermined size is not measured by the second acceleration measuring device;

wherein the second and third collision determining threshold values are set such that a rapid operation in multiple stages of the airbag apparatus is performed irrespective of the result of the measurement by the second acceleration measuring device when the distance of movement of the occupant is small and the change in movement speed of the occupant is large;

wherein the fourth and fifth collision determining threshold values are set, but changing the first collision determining threshold value, such that the operation of the seatbelt pretensioner is more easy to perform than the slow operation in multiple stages of the airbag apparatus when a collision of the predetermined size is measured by the second acceleration measuring device.

2. The collision determining apparatus for a vehicle according to claim 1, wherein the first collision determining threshold value setting device sets respective collision determining threshold values to correspond to each stage of the rapid operation in multiple stages, and within a predetermined time from a point of time at which it was determined that the correlation has exceeded a collision determining threshold value which corresponds to an appropriate stage of the rapid operation, when it is determined that the correlation exceeds a collision determining threshold value which corresponds to a next stage after the appropriate stage, the first control signal generating device generates a control signal which instructs that an operation of the next stage be performed at a point of time at which it is determined that the correlation has exceeded the collision determining threshold value which corresponds to the next stage.

3. The collision determining apparatus for a vehicle according to claim 1, wherein the first collision determining threshold value setting device sets respective collision determining threshold values to correspond to each stage of the rapid operation in multiple stages, and within a predetermined time from a point of time at which it was determined that the correlation has exceeded a collision determining threshold value which corresponds to an appropriate stage of the rapid operation, when it is determined that the correlation exceeds a collision determining threshold value which corresponds to a next stage after the appropriate stage, the first control signal generating device generates a control signal which instructs that an operation of the next stage be performed after the predetermined time has lapsed.

4. The collision determining apparatus for a vehicle according to claim 2, wherein after a predetermined delay time has lapsed since a control signal which instructs that an operation of an appropriate stage of the slow operation be performed, the first control signal generating device generates a control signal which instructs that an operation of the next stage after this appropriate stage of a slow operation be performed.

5. The collision determining apparatus for a vehicle according to claim 3, wherein after a predetermined delay time has lapsed since a control signal which instructs that an operation of an appropriate stage of the slow operation be performed, the first control signal generating device generates a control signal which instructs that an operation of the next stage after this appropriate stage of a slow operation be performed.

6. The collision determining apparatus for a vehicle according to claim 1, wherein the occupant protection apparatus includes an airbag apparatus operable to quickly perform in multiple stages, and the threshold values includes a first threshold value for determining whether or not a first stage operation of the airbag apparatus is allowed, and a second threshold value for determining whether or not a second stage operation of the airbag apparatus is allowed.

7. The collision determining apparatus for a vehicle according to claim 1, wherein the occupant protection apparatus includes an airbag apparatus and a seatbelt pretensioner, and the threshold values includes a threshold value for determining whether or not an operation of the airbag apparatus is allowed, and another threshold value for determining whether or not an operation of the seatbelt pretensioner is allowed.

8. The collision determining apparatus for a vehicle according to claim 1, wherein the second collision determining threshold value is set to a value that is high enough to allow low speed collisions, in which the operation of the occupant protection apparatus is not required.

9. The collision determining apparatus for a vehicle according to claim 1, where the third collision determining threshold value is set to a value that specifies that the second stage operation of the air bag apparatus is to be allowed in an area where the change in movement speed of an occupant is a higher value than for the collision determining threshold value.

10. The collision determining apparatus for a vehicle according to claim 1, wherein the fifth collision determining threshold value is set to a value that specifies that an operation of the seatbelt pretensioner is to be allowed in an area where at least the change in movement speed of an occupant or the distance of movement of the occupant is a lower value than for the fourth collision determining threshold value.

* * * * *